United States Patent
Miyagawa

(10) Patent No.: US 12,198,560 B2
(45) Date of Patent: Jan. 14, 2025

(54) INFORMATION PROCESSING APPARATUS, INFORMATION PROCESSING METHOD, PROGRAM, AND FLIGHT VEHICLE SYSTEM

(71) Applicant: Sony Group Corporation, Tokyo (JP)

(72) Inventor: Hiroshi Miyagawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 365 days.

(21) Appl. No.: 17/770,058

(22) PCT Filed: Nov. 10, 2020

(86) PCT No.: PCT/JP2020/041793
§ 371 (c)(1),
(2) Date: Apr. 19, 2022

(87) PCT Pub. No.: WO2021/095701
PCT Pub. Date: May 20, 2021

(65) Prior Publication Data
US 2022/0398928 A1 Dec. 15, 2022

(30) Foreign Application Priority Data

Nov. 13, 2019 (JP) .................................. 2019-205774

(51) Int. Cl.
*G08G 5/06* (2006.01)
*G08G 5/00* (2006.01)
*G08G 5/04* (2006.01)

(52) U.S. Cl.
CPC ........... *G08G 5/006* (2013.01); *G08G 5/0013* (2013.01); *G08G 5/003* (2013.01); *G08G 5/0043* (2013.01);
(Continued)

(58) Field of Classification Search
CPC ...... G08G 5/006; G08G 5/0013; G08G 5/003; G08G 5/0043; G08G 5/0069; G08G 5/045

See application file for complete search history.

(56) References Cited

U.S. PATENT DOCUMENTS

2018/0253978 A1 9/2018 Tabuchi
2018/0357909 A1 12/2018 Eyhorn
(Continued)

FOREIGN PATENT DOCUMENTS

CN 105206114 A 12/2015
CN 106297417 A 1/2017
(Continued)

OTHER PUBLICATIONS

International Search Report and Written Opinion mailed on Jan. 12, 2021, received for PCT Application PCT/JP2020/041793, Filed on Nov. 10, 2020, 8 pages including English Translation.

*Primary Examiner* — Kenneth J Malkowski
(74) *Attorney, Agent, or Firm* — XSENSUS LLP

(57) ABSTRACT

An information processing apparatus and corresponding information processing method performed by the information processing apparatus. The information processing apparatus includes a transceiver and a control circuit. The method includes: determining a number of flight vehicles within a predetermined region around exclusive controlled airspace; and transmitting one or more control signals to limit a number of flight vehicles that enter the exclusive controlled airspace, the exclusive controlled airspace including an area where the flight vehicles cannot report their own locations.

15 Claims, 20 Drawing Sheets

(52) U.S. Cl.
CPC ........... *G08G 5/0069* (2013.01); *G08G 5/045* (2013.01); *B64U 2201/10* (2023.01)

(56) References Cited

U.S. PATENT DOCUMENTS

| | | | |
|---|---|---|---|
| 2019/0012922 A1* | 1/2019 | Selander | H04W 4/021 |
| 2020/0365037 A1* | 11/2020 | Yamada | G05D 1/102 |
| 2020/0365039 A1* | 11/2020 | Yamada | G08G 5/0039 |

FOREIGN PATENT DOCUMENTS

| | | |
|---|---|---|
| CN | 106898162 A | 6/2017 |
| CN | 107085977 A | 8/2017 |
| CN | 107108022 A | 8/2017 |
| CN | 108352122 A | 7/2018 |
| CN | 108496213 A | 9/2018 |
| CN | 109074099 A | 12/2018 |
| CN | 109357685 A | 2/2019 |
| CN | 110099389 A | 8/2019 |
| EP | 1857904 A1 | 11/2007 |
| JP | 2012-131484 A | 7/2012 |
| JP | 2017-120534 A | 7/2017 |
| JP | 2019-91288 A | 6/2019 |
| WO | WO-2017100579 A1 | 6/2017 |
| WO | 2019/098016 A1 | 5/2019 |
| WO | WO-2019098017 A1 | 5/2019 |

\* cited by examiner

FIG. 1
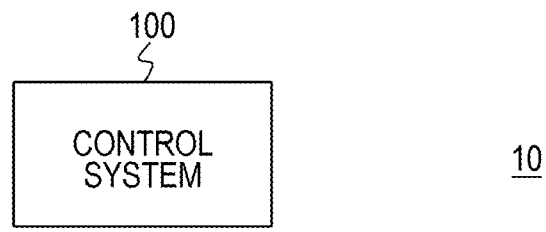
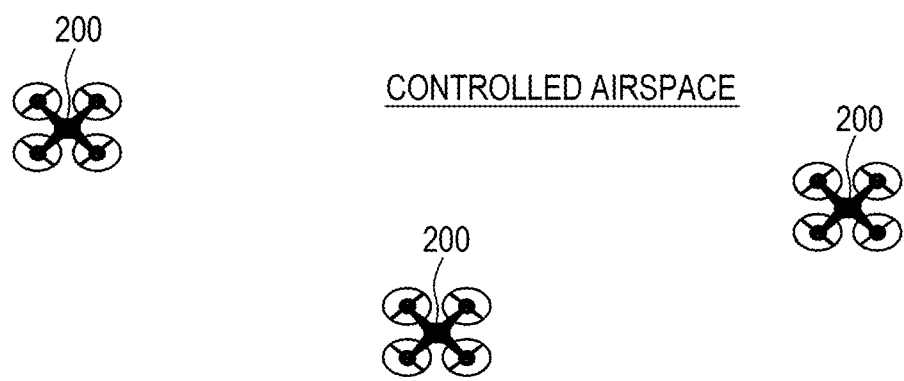
FIG. 2
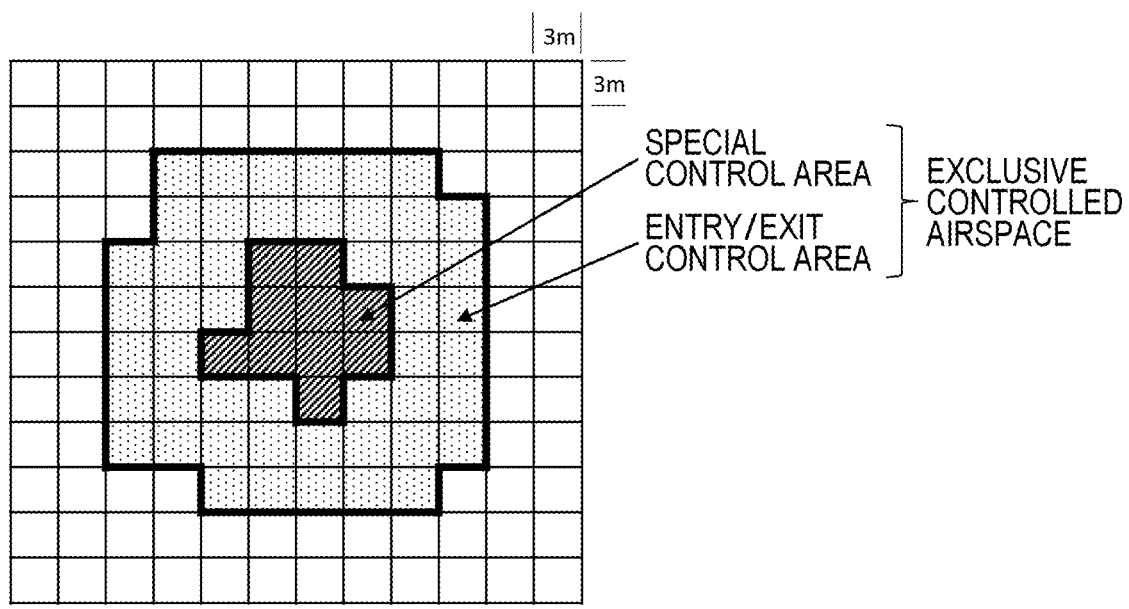

FIG. 7

| EXCLUSIVE CONTROLLED AIRSPACE | ENTERING DRONE INDIVIDUAL IDENTIFICATION NUMBER | ENTRY PERMISSION TIME | ENTRY NOTIFICATION TIME | ESTIMATED EXIT TIME |
|---|---|---|---|---|
| 1 | 1234-5678-1201 | 2019/1/10 12:34:03 | 2019/1/10 12:34:12 | 2019/1/10 13:00:00 |
| 2 | N/A | — | — | — |
| 3 | 5703-2341-3410 | 2019/1/10 12:37:20 | 2019/1/10 12:37:51 | 2019/1/10 13:05:00 |
| ... | ... | ... | ... | ... |

FIG. 8

EXCLUSIVE CONTROLLED AIRSPACE-1  DRONE WITH PENDING ENTRY APPLICATION

| DRONE WITH PENDING ENTRY APPLICATION INDIVIDUAL IDENTIFICATION NUMBER | ENTRY APPLICATION TIME |
|---|---|
| 2345-1890-2305 | 2019/1/10 12:35:11 |
| 7823-7832-3583 | 2019/1/10 12:36:25 |
| 3511-0273-7835 | 2019/1/10 12:36:35 |

EXCLUSIVE CONTROLLED AIRSPACE-2  DRONE WITH PENDING ENTRY APPLICATION

| DRONE WITH PENDING ENTRY APPLICATION INDIVIDUAL IDENTIFICATION NUMBER | ENTRY APPLICATION TIME |
|---|---|
| (N/A) | — |

EXCLUSIVE CONTROLLED AIRSPACE-3  DRONE WITH PENDING ENTRY APPLICATION

| DRONE WITH PENDING ENTRY APPLICATION INDIVIDUAL IDENTIFICATION NUMBER | ENTRY APPLICATION TIME |
|---|---|
| 1345-1890-2306 | 2019/1/10 12:45:32 |
| 6823-7832-3584 | 2019/1/10 12:47:53 |

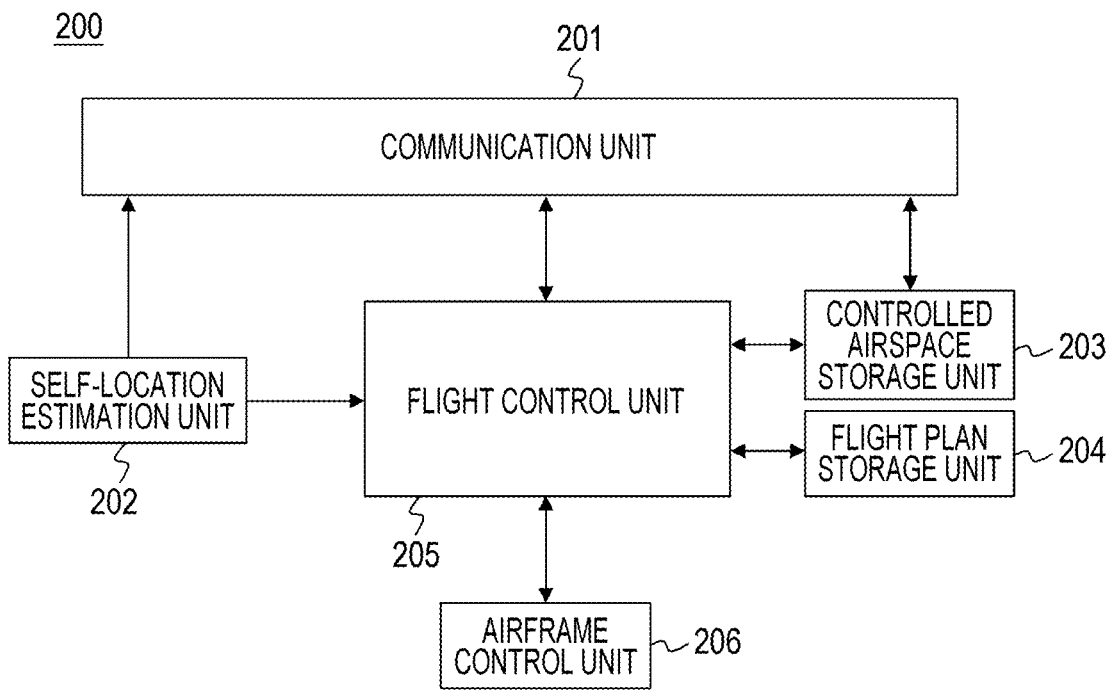

FIG. 11

| Waypoint ATTRIBUTES | | SETTING TIMING | OUTLINE |
|---|---|---|---|
| START | | SET BY OPERATOR WHEN FLIGHT PLAN IS SET | POINT WHERE FLIGHT IS STARTED |
| GOAL | | SET BY OPERATOR WHEN FLIGHT PLAN IS SET | LANDING POINT |
| TRANSIT POINT | | SET BY OPERATOR WHEN FLIGHT PLAN IS SET | POINT WHERE DRONE PASSES THROUGH |
| FOR EXCLUSIVE CONTROLLED AIRSPACE | ENTRY APPLICATION POINT | SET BY SYSTEM WHEN FLIGHT PLAN IS SET | ENTRY APPLICATION IS SUBMITTED TO CONTROLLER WHEN DRONE PASSES THROUGH THIS POINT. |
| | ENTRY WAITING POINT | SET BY SYSTEM WHEN FLIGHT PLAN IS SET | DRONE STOPS AND WAITS AT PRESENT Waypoint WHEN STANDBY INSTRUCTION IS ISSUED BY CONTROLLER. (CONSIDERED SAME AS "TRANSIT POINT" WHEN ENTRY PERMISSION IS GRANTED) |
| | ENTRY NOTIFICATION POINT | SET BY SYSTEM WHEN FLIGHT PLAN IS SET | ENTRY NOTIFICATION IS PROVIDED TO CONTROLLER WHEN DRONE PASSES THROUGH THIS POINT. |
| | EXIT APPLICATION POINT | SET BY SYSTEM WHEN FLIGHT PLAN IS SET | EXIT APPLICATION IS SUBMITTED TO CONTROLLER WHEN DRONE PASSES THROUGH THIS POINT. |
| | EXIT NOTIFICATION POINT | SET BY SYSTEM WHEN FLIGHT PLAN IS SET | EXIT NOTIFICATION IS PROVIDED TO CONTROLLER WHEN DRONE PASSES THROUGH THIS POINT. |

FIG. 21

EXCLUSIVE CONTROLLED AIRSPACE-1  ENTERING DRONE

| ENTERING DRONE INDIVIDUAL IDENTIFICATION NUMBER | ABILITY TO AVOID OTHER FLIGHT VEHICLES | ENTRY PERMISSION TIME | ENTRY NOTIFICATION TIME | ESTIMATED EXIT TIME |
|---|---|---|---|---|
| 1234-5678-1201 | ABLE | 2019/1/10 12:34:03 | 2019/1/10 12:34:12 | 2019/1/10 13:00:00 |
| 1254-3570-8803 | ABLE | 2019/1/10 12:35:21 | 2019/1/10 12:35:55 | 2019/1/10 13:10:00 |

EXCLUSIVE CONTROLLED AIRSPACE-2  ENTERING DRONE

| ENTERING DRONE INDIVIDUAL IDENTIFICATION NUMBER | ABILITY TO AVOID OTHER FLIGHT VEHICLES | ENTRY PERMISSION TIME | ENTRY NOTIFICATION TIME | ESTIMATED EXIT TIME |
|---|---|---|---|---|
| N/A | — | — | — | — |

EXCLUSIVE CONTROLLED AIRSPACE-3  ENTERING DRONE

| ENTERING DRONE INDIVIDUAL IDENTIFICATION NUMBER | ABILITY TO AVOID OTHER FLIGHT VEHICLES | ENTRY PERMISSION TIME | ENTRY NOTIFICATION TIME | ESTIMATED EXIT TIME |
|---|---|---|---|---|
| 5703-2341-3410 | UNABLE | 2019/1/10 12:37:20 | 2019/1/10 12:37:51 | 2019/1/10 13:05:00 |

FIG. 22

EXCLUSIVE CONTROLLED AIRSPACE-1  DRONE WITH PENDING ENTRY APPLICATION

| DRONE WITH PENDING ENTRY APPLICATION INDIVIDUAL IDENTIFICATION NUMBER | ABILITY TO AVOID OTHER FLIGHT VEHICLES | ENTRY APPLICATION TIME |
|---|---|---|
| 2345-1890-2305 | UNABLE | 2019/1/10 12:35:11 |
| 7823-7832-3583 | ABLE | 2019/1/10 12:36:25 |
| 3511-0273-7835 | UNABLE | 2019/1/10 12:36:35 |

EXCLUSIVE CONTROLLED AIRSPACE-2  DRONE WITH PENDING ENTRY APPLICATION

| DRONE WITH PENDING ENTRY APPLICATION INDIVIDUAL IDENTIFICATION NUMBER | ABILITY TO AVOID OTHER FLIGHT VEHICLES | ENTRY APPLICATION TIME |
|---|---|---|
| (N/A) | — | — |

EXCLUSIVE CONTROLLED AIRSPACE-3  DRONE WITH PENDING ENTRY APPLICATION

| DRONE WITH PENDING ENTRY APPLICATION INDIVIDUAL IDENTIFICATION NUMBER | ABILITY TO AVOID OTHER FLIGHT VEHICLES | ENTRY APPLICATION TIME |
|---|---|---|
| 1345-1890-2306 | UNABLE | 2019/1/10 12:45:32 |
| 6823-7832-3584 | ABLE | 2019/1/10 12:47:53 |

⋮

INFORMATION PROCESSING APPARATUS, INFORMATION PROCESSING METHOD, PROGRAM, AND FLIGHT VEHICLE SYSTEM

CROSS-REFERENCE TO RELATED APPLICATIONS

The present application is based on PCT filing PCT/JP2020/041793, filed Nov. 10, 2020, which claims priority to JP 2019-205774, filed Nov. 13, 2019, the entire contents of each are incorporated herein by reference.

TECHNICAL FIELD

The present technology relates to an information processing apparatus, an information processing method, a program, and a flight vehicle system, and more particularly to an information processing apparatus and the like for enabling flight of a flight vehicle even in, for example, a wireless communication unavailable area.

BACKGROUND ART

Conventionally, as a method for controlling drones that are flight vehicles, the following mechanism for preventing a collision between drones has been studied. In the mechanism, drones under control individually report their own locations to a control system on a regular basis. As a result, the control system grasps the locations of the drones under control, and issues an avoidance instruction in a case where the drones come excessively close to each other and are at risk of collision. In order to control drones with this mechanism, it is necessary to enable the control system and the drones to constantly perform wireless communication with each other.

For example, Patent Document 1 describes a technique of preventing a flight vehicle from being put in a state where the flight vehicle cannot perform wireless communication during flight, by storing positional information on a position where radio waves of a base station do not satisfy a predetermined reception condition and setting the position in a no-fly zone. In this case, it is possible to avoid a failure in wireless communication between the control system and the drones, but it is not possible to allow a flight vehicle to fly in wireless communication unavailable airspace, resulting in the inconvenience of being unable to effectively use the wireless communication unavailable airspace.

CITATION LIST

Patent Document

Patent Document 1: Japanese Patent Application Laid-Open No. 2017-120534

SUMMARY OF THE INVENTION

Problems to be Solved by the Invention

An object of the present technology is to allow a flight vehicle to safely fly even in a wireless communication unavailable area or the like where the flight vehicle cannot report its own location.

Solutions to Problems

The concept of the present technology resides in an information processing apparatus including:

a controlling control unit that performs control in such a way as to limit the number of flight vehicles that enter exclusive controlled airspace, the exclusive controlled airspace including an area where the flight vehicles cannot report their own locations.

In the present technology, control is performed by the controlling control unit in such a way as to limit the number of flight vehicles that enter exclusive controlled airspace. Here, the exclusive controlled airspace is airspace including an area where the flight vehicles cannot report their own locations. For example, a special control area may be airspace including an area where the flight vehicles cannot perform wireless communication or an area where the flight vehicles cannot obtain their own locations. Flight vehicles cannot report their own locations in these areas. Furthermore, for example, the flight vehicles may be drones.

For example, the controlling control unit may limit the number of flight vehicles that enter the exclusive controlled airspace to one. In this case, for example, in a case where the controlling control unit receives an entry application from one of the flight vehicles that seeks to enter the exclusive controlled airspace, the controlling control unit may transmit entry permission to the one of the flight vehicles when none of the flight vehicles other than the one of the flight vehicles has entered the exclusive controlled airspace. In this case, for example, when any of the flight vehicles other than the one of the flight vehicles has entered the exclusive controlled airspace, a standby instruction may be transmitted to the one of the flight vehicles.

Furthermore, in this case, for example, in a case where the controlling control unit receives the entry application from the one of the flight vehicles that seeks to enter the exclusive controlled airspace, the controlling control unit may update entering flight vehicle information for the exclusive controlled airspace when none of the flight vehicles other than the one of the flight vehicles has entered the exclusive controlled airspace, when the entry permission is transmitted to the flight vehicle, or when entry notification is received from the flight vehicle. Then, in this case, for example, the exclusive controlled airspace may include a special control area and an entry/exit control area, the special control area being an area where a self-location report cannot be made, the entry/exit control area being set around the special control area. In addition, the entry application may be received before the one of the flight vehicles enters the entry/exit control area, and the entry notification may be received after the one of the flight vehicles enters the entry/exit control area.

Furthermore, for example, in a case where the controlling control unit receives an exit application from one of the flight vehicles that seeks to leave the exclusive controlled airspace, the controlling control unit may transmit exit permission to the one of the flight vehicles when there is no other flight vehicle around the one of the flight vehicles. In this case, for example, the controlling control unit may transmit a standby instruction to the one of the flight vehicles when there is any other flight vehicle around the one of the flight vehicles.

Furthermore, in this case, for example, the controlling control unit may update entering flight vehicle information for the exclusive controlled airspace when the exit application is received from the one of the flight vehicles that seeks to leave the exclusive controlled airspace, when the exit permission is transmitted to the flight vehicle, or when exit notification is received from the one of the flight vehicles to which the exit permission has been transmitted. Then, in this case, for example, when there are a predetermined number of flight vehicles in an entry waiting state, the controlling control unit may transmit entry permission to a flight vehicle having been put in the waiting state earliest. Moreover, in this case, for example, the exclusive controlled airspace may include a special control area and an entry/exit control area, the special control area being an area where a self-location report cannot be made, the entry/exit control area being set around the special control area. In addition, the exit application may be received after the one of the flight vehicles enters the entry/exit control area, and the exit notification may be received after the one of the flight vehicles leaves the entry/exit control area.

Furthermore, for example, in a case where the flight vehicle that does not have an ability to avoid other flight vehicles has entered the exclusive controlled airspace, the controlling control unit may limit the number of the flight vehicles that enter the exclusive controlled airspace to one while the flight vehicle that does not have the ability to avoid other flight vehicles exists in the exclusive controlled airspace.

Furthermore, for example, in a case where the flight vehicle having the ability to avoid other flight vehicles has entered the exclusive controlled airspace, the controlling control unit may permit the flight vehicle having the ability to avoid other flight vehicles to enter the exclusive controlled airspace. In this case, for example, the controlling control unit may be configured such that in a case where the number of the flight vehicles having entered the exclusive controlled airspace and having the ability to avoid other flight vehicles has reached an upper limit, the controlling control unit does not permit the flight vehicle having the ability to avoid other flight vehicles to enter the exclusive controlled airspace.

Furthermore, for example, the controlling control unit may be configured such that in a case where the flight vehicle having the ability to avoid other flight vehicles has entered the exclusive controlled airspace, the controlling control unit does not permit the flight vehicle that does not have the ability to avoid other flight vehicles to enter the exclusive controlled airspace. In this case, for example, the controlling control unit may be configured such that the controlling control unit does not permit the flight vehicle that does not have the ability to avoid other flight vehicles to enter the exclusive controlled airspace until all the flight vehicles having entered the exclusive controlled airspace leave the exclusive controlled airspace.

As described above, in the present technology, control is performed in such a way as to limit the number of flight vehicles that enter exclusive controlled airspace including an area where a self-location report cannot be made. Therefore, it is possible to allow flight vehicles to safely fly even in this exclusive controlled airspace, so that this exclusive controlled airspace can be effectively used.

In addition, another concept of the present technology resides in a flight vehicle system including:
a control system; and
a predetermined number of flight vehicles existing in controlled airspace of the control system,
in which exclusive controlled airspace is set, the exclusive controlled airspace including an area where the flight vehicles cannot report their own locations to the control system,
the flight vehicles transmit entry applications and exit applications to the control system in a case where the flight vehicles pass through the exclusive controlled airspace, and
the control system performs control in such a way as to limit the number of the flight vehicles that enter the exclusive controlled airspace on the basis of the entry applications and the exit applications transmitted from the flight vehicles.

In the present technology, there are included a control system and a predetermined number of flight vehicles existing in controlled airspace of the control system. There is set exclusive controlled airspace including an area where the flight vehicles cannot report their own locations to the control system. In a case where the flight vehicles pass through the exclusive controlled airspace, entry applications and exit applications are transmitted to the control system. Furthermore, in the control system, control is performed in such a way as to limit the number of the flight vehicles that enter the exclusive controlled airspace on the basis of the entry applications and the exit applications transmitted from the flight vehicles.

As described above, in the present technology, control is performed in the control system in such a way as to limit the number of the flight vehicles that enter the exclusive controlled airspace on the basis of the entry applications and the exit applications transmitted from the flight vehicles to the control system. Therefore, it is possible to allow flight vehicles to safely fly even in this exclusive controlled airspace, so that this exclusive controlled airspace can be effectively used.

BRIEF DESCRIPTION OF DRAWINGS

FIG. 1 is a diagram showing a configuration example of a flight vehicle system.

FIG. 2 is a diagram showing an example of setting a special control area and an entry/exit control area, in which the special control area and the entry/exit control area are represented as a grid map.

FIG. 7 is a diagram showing an example of entering drone information to be managed by an exclusive controlled airspace entry management unit.

FIG. 8 is a diagram showing an example of entry application pending drone information to be managed by the exclusive controlled airspace entry management unit.

FIG. 9 is a diagram showing a configuration example of the drone.

FIG. 11 is a diagram showing a list of types of waypoints.

FIG. 21 is a diagram showing an example of entering drone information to be managed by an exclusive controlled airspace entry management unit.

FIG. 22 is a diagram showing an example of entry application pending drone information to be managed by the exclusive controlled airspace entry management unit.

MODE FOR CARRYING OUT THE INVENTION

Figure 3:
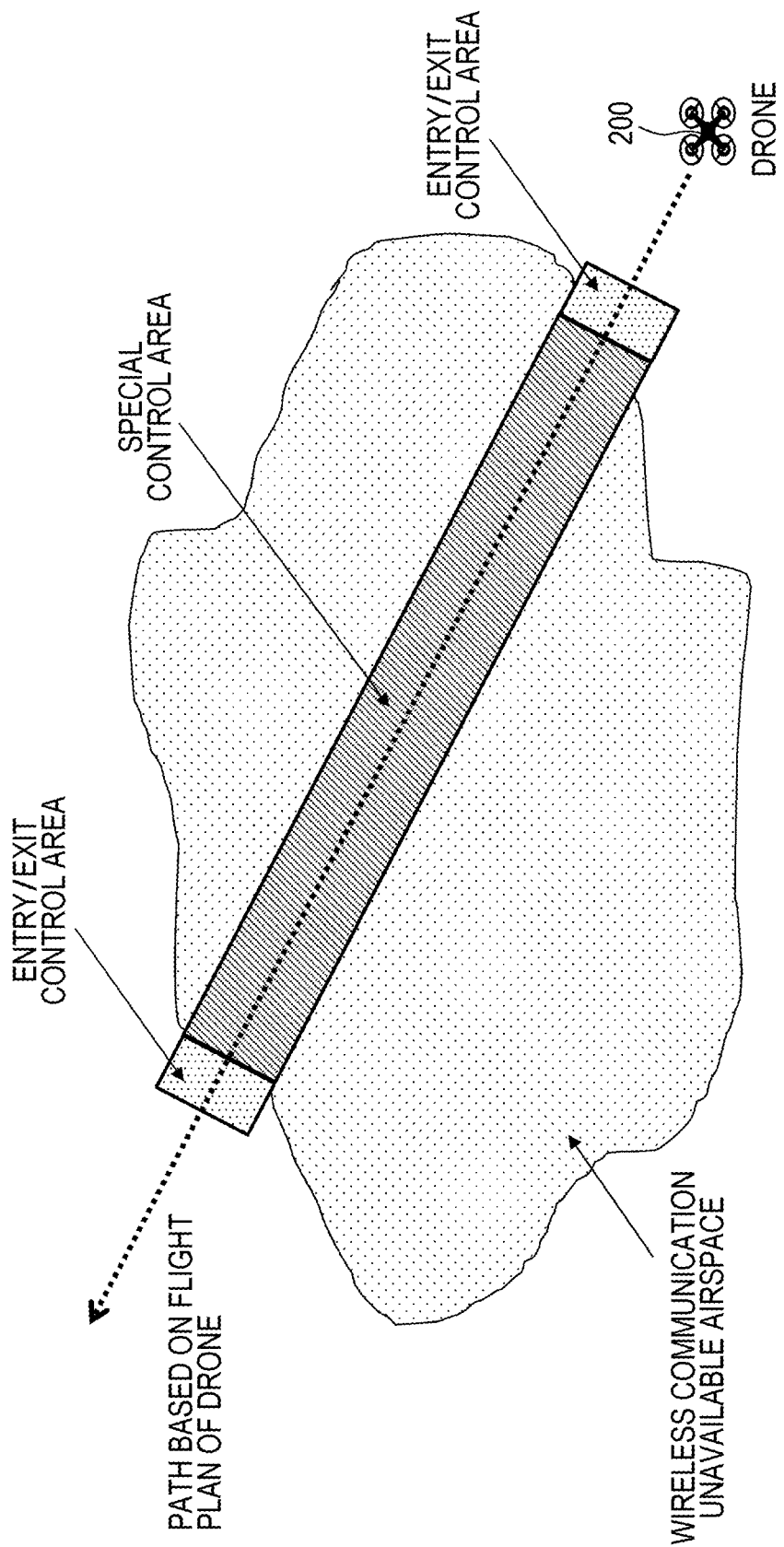
FIG. 3 is a diagram showing an example of setting the special control area and the entry/exit control area in a case where the efficiency of using airspace significantly decreases if an entire area where communication is difficult is regarded as exclusive because the area is a broad area such as a mountainous area.

Modes for carrying out the invention (hereinafter referred to as "embodiments") will be described below. Note that description will be provided in the following order.
1. First Embodiment
2. Second Embodiment
3. Variations 1. First Embodiment Configuration Example of Flight Vehicle System FIG. 1 shows a configuration example of a flight vehicle system 10 as a first embodiment. The flight vehicle system 10 includes a control system 100 and a predetermined number of drones 200 existing in airspace to be controlled by the control system 100. Here, three drones 200 are included in the flight vehicle system 10. Here, the drone 200 forms a flight vehicle.

In the flight vehicle system 10, the drones 200 under control individually report their own locations to the control system 100 on a regular basis, so that the control system 100 grasps the locations of the drones 200 under control. Then, in a case where the drones 200 come excessively close to each other and are at risk of collision, the control system 100 issues an avoidance instruction to the drones 200, and controls the drones 200 so as to avoid a collision between the drones 200.

Furthermore, in the flight vehicle system 10, the control system 100 performs control such that only a single drone 200 enters exclusive controlled airspace including an area where the drone 200 cannot report its own location to the control system 100. As a result of controlling flight vehicles in this way, it is possible to allow the flight vehicles to safely fly even in this exclusive controlled airspace, so that this special control area can be effectively used.

Here, the area where the drone 200 cannot report its own location corresponds to an area where the drone 200 cannot perform wireless communication or an area where the drone 200 cannot obtain its own location. In these areas, the drone 200 cannot report its own location to the control system 100. In a case where a plurality of the drones 200 enters this area, the control system 100 cannot provide an instruction to avoid a collision between the drones 200 since the control system 100 cannot grasp the location of each drone 200. Note that the above-described area where wireless communication cannot be performed includes an area where wireless communication is extremely unstable.

Assume a case where the control system 100 receives an entry application from the drone 200 seeking to enter a special control area. When there is no other drone 200 having entered the special control area, the control system 100 transmits entry permission to the drone 200 having made the entry application. Meanwhile, when there is any other drone 200 having entered the special control area, the control system 100 transmits a standby instruction to the drone 200 having made the entry application. In addition, the control system 100 updates entering drone information for the exclusive controlled airspace when transmitting the entry permission.

Furthermore, assume a case where the control system 100 receives an exit application from the drone 200 seeking to leave the exclusive controlled airspace. When there is no other drone 200 around the drone 200 having made the exit application, the control system 100 transmits exit permission to the drone 200 having made the exit application. Meanwhile, when there is any other drone 200 around the drone 200 having made the exit application, the control system 100 transmits a standby instruction to the drone 200 having made the exit application.

Moreover, in a case where the control system 100 receives exit notification from the drone 200 to which the exit permission has been transmitted, the control system 100 updates the entering drone information for the exclusive controlled airspace. Then, in this case, when there are a predetermined number of flight vehicles in an entry waiting state, the control system 100 transmits entry permission to the drone 200 having been put in the waiting state earliest.

In this embodiment, the exclusive controlled airspace includes a special control area and an entry/exit control area set. The special control area is an area where a self-location report cannot be made. The entry/exit control area is set around the special control area. That is, the exclusive controlled airspace includes two areas, the special control area and the entry/exit control area.

As described above, the special control area is an area where the drone 200 cannot perform wireless communication (including an area where wireless communication is extremely unstable) or an area where the drone 200 cannot obtain its own location. That is, the special control area is an area for which the control system 100 cannot perform normal control. This special control area will be acquired by, for example, measurement performed by a drone flown separately, or by other means. Note that the drone 200 under control may report, to the control system 100, airspace where the drone 200 could not perform communication or obtain its own location such that information on this special control area can be created/updated on the basis of the report.

The entry/exit control area is an area that is set around the special control area and used for controlling the drones 200 that enter and leave the special control area. Unlike the special control area, this entry/exit control area is an area where the drone 200 can report its own location to the control system 100.

A width W of airspace set as the entry/exit control area is determined in consideration of, for example, the average moving speed of the drone 200 and an interval at which the drone 200 attempts to communicate with the control system 100. For example, assuming that an estimated moving speed is 10 [m/s], communication is attempted at intervals of 1 [s], and the drone 200 attempts communication three times before communication is established after the drone 200 enters an area where communication can be performed, the width W is defined as shown in formula (1) below.

$$W=10 \text{ [m/s]} \times 1 \text{ [s]} \times 3 \text{ [times]} = 30 \text{ [m]} \quad (1)$$

In the case of managing airspace in a grid shape of, for example, 3 [m] square, a grid is defined as a special control area if it is known that it is difficult to perform communication in the grid. Then, for example, dilation processing in image processing is performed on the special control area until the width of an entry/exit control area reaches a required value. As a result, it is possible to set the entire area as the exclusive controlled airspace and set the area increased by the dilation processing as the entry/exit control area.

FIG. 2 shows an example of setting the special control area and the entry/exit control area, in which the special control area and the entry/exit control area are represented as a grid map. In this example, grid size is set as 3 [m] square, and the entry/exit control area has a width of 2 grids=6 [m].

Furthermore, in the case of managing the airspace in a vector format, a special control area and exclusive control airspace may be set as follows. An area is defined as a special control area if it is known that it is difficult to perform communication in the area. The exclusive control airspace is set by use of the Minkowski sum of the area and a circle with a radius equal to the width of the entry/exit control area described above.

Note that it is conceivable that there is a case where the efficiency of using airspace may significantly decrease if an entire area where communication is difficult is regarded as exclusive because the area is a broad area such as a mountainous area. In such a case, the exclusive controlled airspace may be set as shown in FIG. 3 on the basis of a flight plan of the drone 200. That is, an area with a sufficient width is set as a special control area for a path of the drone 200 in consideration of the influence of the weather and the performance of the drone 200. Then, entry/exit control areas are disposed before and after the special control area on the path of the flight plan.

Figure 4:
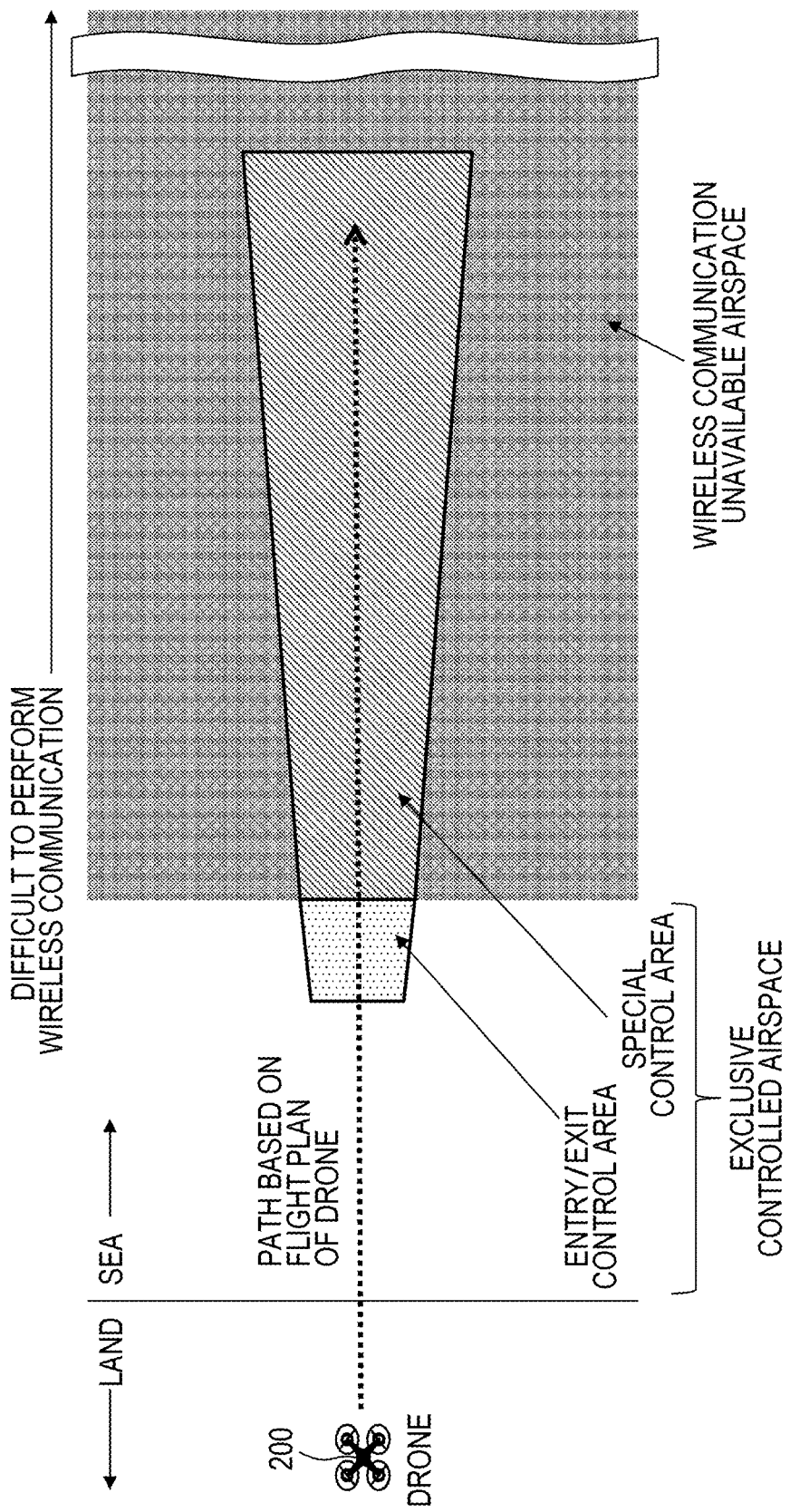
FIG. 4 is a diagram showing an example of setting the special control area and the entry/exit control area in a case where it is difficult to make an area where communication is difficult into a closed area, such as the case of flying from land to the sea.

In addition, there may be a case where it is difficult to make an area where communication is difficult into a closed area, such as the case of flying from land to the sea. In such a case, the exclusive controlled airspace may be set as shown in FIG. 4. That is, an area cut out in a strip or radial shape with a sufficient width is set as a special control area for the path based on the flight plan of the drone 200 in consideration of the influence of the weather and the performance of the drone. Then, an entry/exit control area is placed on a side at which the drone 200 enters/leaves the area (in this case, a land side).

"Outline of Control in Exclusive Controlled Airspace"

Figure 5:
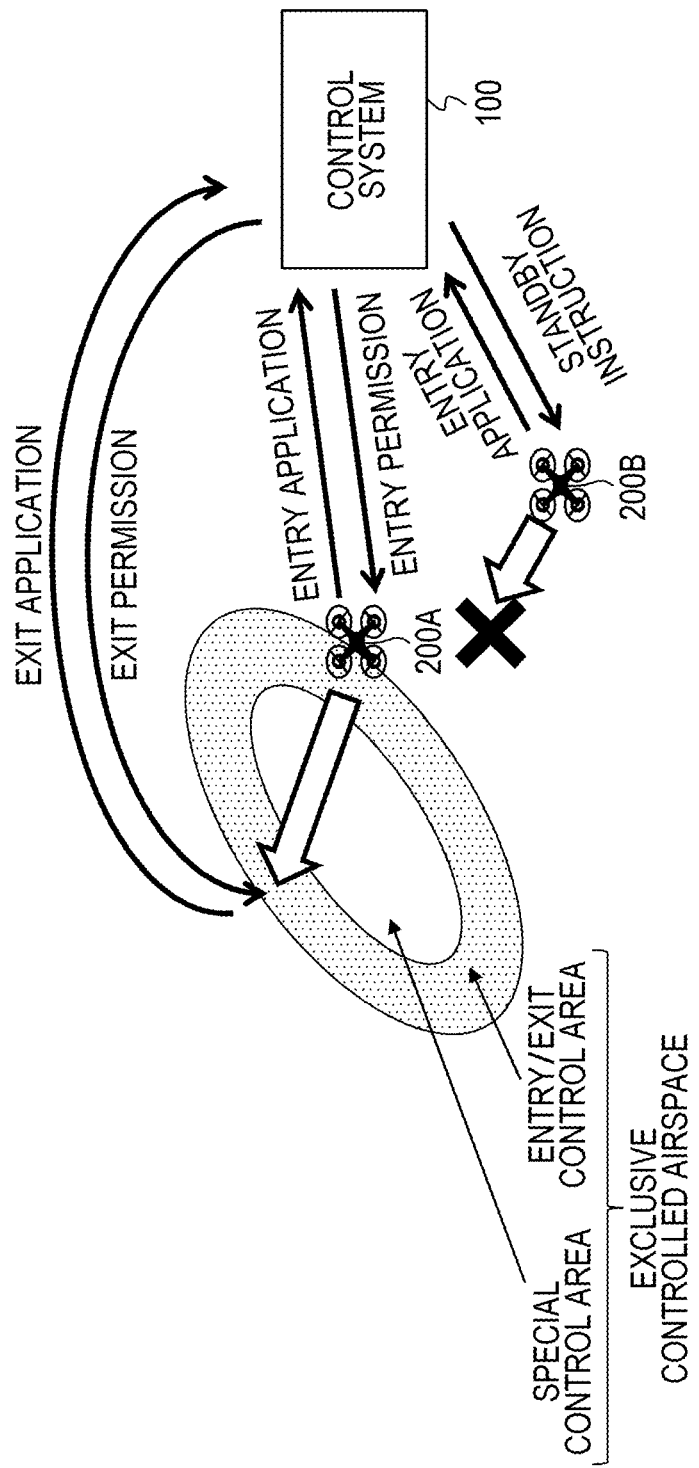
FIG. 5 is a diagram showing an outline of control to be performed by a control system over drones passing through the exclusive controlled airspace.

FIG. 5 shows an outline of control to be performed by the control system 100 over drones 200A and 200B passing through the exclusive controlled airspace. This case is based on the assumption that there is exclusive controlled airspace on paths of the drones 200A and 200B, the drone 200A is flying closer to the exclusive controlled airspace than the drone 200B, and the drone 200A enters the exclusive controlled airspace earlier than the drone 200B.

First, the drone 200A transmits an entry application to the control system 100 before entering the exclusive controlled airspace. In response thereto, the control system 100 transmits entry permission to the drone 200A because no other drone has entered the exclusive controlled airspace. When transmitting the entry permission, the control system 100 adds information on a drone A to the entering drone information so as to indicate that the drone 200A is entering the exclusive controlled airspace.

Upon receiving the entry permission from the control system 100, the drone 200A enters the exclusive controlled airspace, and flies along the flight path. When the drone 200A has entered the entry/exit control area, the drone 200A transmits entry notification to the control system 100. The drone 200A then enters the special control area, and flies along the flight path.

Upon receiving the entry notification from the drone 200A, the control system 100 updates the entering drone information for the special control area. For example, in this case, entry notification time of the drone A is added.

Next, while the drone 200A is in the exclusive controlled airspace, the drone 200B transmits an entry application to the control system 100 before entering the exclusive controlled airspace. In response thereto, the control system 100 transmits a standby instruction to the drone 200B because the drone 200A has entered the exclusive controlled airspace. Upon receiving the standby instruction from the control system 100, the drone 200B waits without entering the exclusive controlled airspace.

Next, the drone 200A transmits an exit application to the control system 100 while flying in the entry/exit control area before leaving the exclusive controlled airspace. In response thereto, the control system 100 transmits exit permission to the drone 200A because there is no other drone around the drone 200A.

Upon receiving the exit permission from the control system 100, the drone 200A leaves the exclusive controlled airspace, and flies along the flight path. The drone 200A transmits exit notification to the control system 100 when the drone 200A has left the exclusive controlled airspace.

Upon receiving the exit notification from the drone 200A, the control system 100 deletes the information on the drone A from the entering drone information so as to indicate that the drone 200A has left the exclusive controlled airspace. Furthermore, at this time, since the drone 200B is in a waiting state, the control system 100 transmits entry permission to the drone 200B. When transmitting the entry permission, the control system 100 adds information on a drone B to the entering drone information so as to indicate that the drone 200B is entering the exclusive controlled airspace.

Upon receiving the entry permission from the control system 100, the drone 200B enters the exclusive controlled airspace, and flies along the flight path. Although detailed description is omitted, the drone 200B and the control system 100 subsequently operate as in the case of the drone 200A described above.

Configuration Example of Control System

Figure 6:
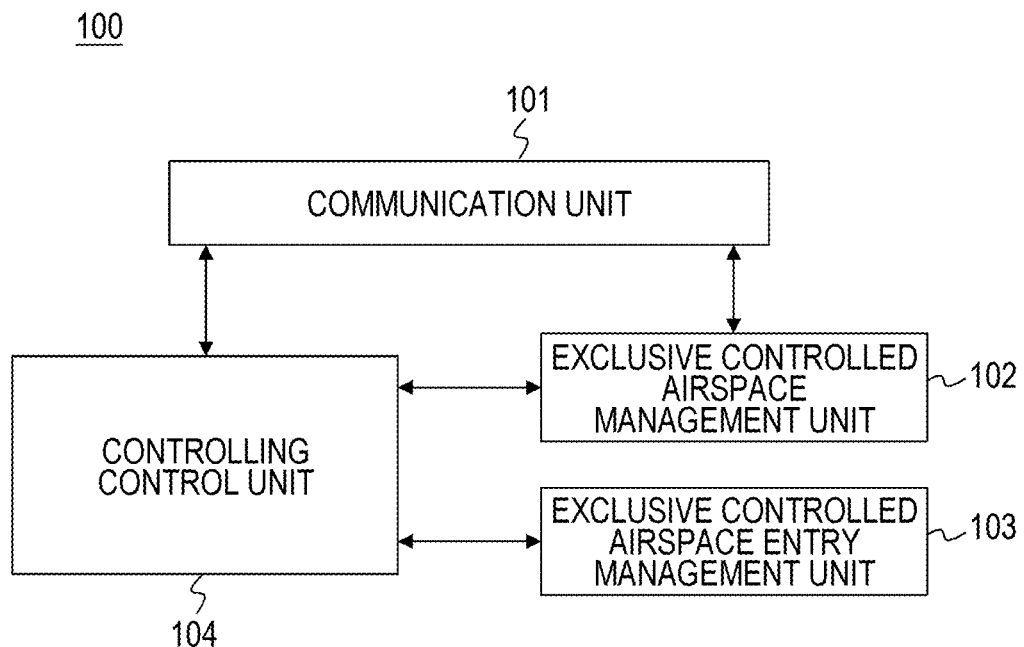
FIG. 6 is a diagram showing a configuration example of the control system.

FIG. 6 shows a configuration example of the control system 100. Part or all of the processing of each unit in the control system 100 can be implemented by software processing to be performed by a computer. The control system 100 includes a communication unit 101, an exclusive controlled airspace management unit 102, an exclusive controlled airspace entry management unit 103, and a controlling control unit 104.

The communication unit 101 communicates with the drone 200 under the control of the control system 100. The exclusive controlled airspace management unit 102 stores and manages information regarding the definition of the exclusive controlled airspace (hereinafter, appropriately referred to as "controlled airspace information"). This controlled airspace information includes information on the special control area and information on the entry/exit control area (see FIG. 5).

The special control area is acquired in advance by, for example, measurement performed by a drone flown separately, or by other means, and is also updated as needed on the basis of report information from the drone 200 under control. Then, the entry/exit control area is set on the basis of the special control area (refer to the above description of the case of managing airspace in a grid shape or the case of managing airspace in a vector format).

Note that the exclusive controlled airspace management unit 102 may be configured such that the exclusive controlled airspace management unit 102 stores and manages only the information on the special control area, and sets an entry/exit control area around the special control area as necessary to generate exclusive controlled airspace.

The exclusive controlled airspace entry management unit 103 manages the drone 200 that is entering and the drone 200 with a pending entry application (being waiting for entry according to a standby instruction issued in response to the entry application) for each exclusive controlled airspace. That is, the exclusive controlled airspace entry management unit 103 manages the entering drone information and entry application pending drone information.

The entering drone information includes information such as a solid identification number, entry permission time, entry notification time, and estimated exit time for the drone 200 entering each exclusive controlled airspace. The estimated exit time is set on the basis of a flight plan submitted to the control system 100 in advance. Alternatively, the estimated exit time is set to time obtained as a result of mechanically adding a certain period of time to the entry permission time on the control system 100 side. FIG. 7 shows an example of the entering drone information to be managed by the exclusive controlled airspace entry management unit 103. This example shows that the drone 200 with the individual identification number "1234-5678-1201" is entering exclusive controlled airspace-1, and the drone 200 with the individual identification number "5703-2341-3410" is entering exclusive controlled airspace-3. Furthermore, this example shows that there is no entry of the drone 200 into exclusive controlled airspace-2.

The entry application pending drone information includes, for each exclusive controlled airspace, information such as an individual identification number and entry application time for the drone 200 of the drone 200 with a pending entry application. In this case, the information on each drone 200 is managed as a first-in first-out (FIFO) queue for each exclusive controlled airspace, making it easy to allow the drone 200 that has made an application earlier to enter the exclusive controlled airspace earlier.

FIG. 8 shows an example of the entry application pending drone information to be managed by the exclusive controlled airspace entry management unit 103. This example shows that three drones 200 with the individual identification numbers "2345-1890-2305", "7823-7832-3583", and "3511-0273-7835" are waiting for entry into exclusive controlled airspace-1 in this order. Furthermore, this example shows that there is no drone 200 waiting for entry into exclusive controlled airspace-2. Furthermore, this example shows that two drones 200 with the individual identification numbers "1345-1890-2306" and "6823-7832-3584" are waiting for entry into exclusive controlled airspace-3 in this order.

Note that, the above description is based on the assumption that each drone 200 has a solid identification number (airframe number). However, the control system 100 is required to also perform similar control over the drone 200 having no individual identification number. For the drone 200 having no individual identification number, the control system 100 may use, for example, an ID number recorded on a subscriber identity module (SIM) card instead of an individual identification number to perform individual identification.

The controlling control unit 104 determines, for example, whether or not to permit an entry into exclusive controlled airspace or whether or not to permit an exit from the exclusive controlled airspace on the basis of an application or notification received from the drone 200 under control, by communicating with the exclusive controlled airspace management unit 102 and the exclusive controlled airspace entry management unit 103 via the communication unit 101. Then, the controlling control unit 104 transmits a result of the determination to the drone 200 via the communication unit 101.

In this case, for example, when receiving an entry application to enter certain exclusive controlled airspace from a certain drone 200, the controlling control unit 104 determines whether or not any other drone 200 is entering the exclusive controlled airspace on the basis of the entering drone information (see FIG. 7) managed by the exclusive controlled airspace entry management unit 103.

When it is determined that no other drone 200 is entering, the controlling control unit 104 transmits entry permission to the drone 200 that has transmitted the entry application. When transmitting the entry permission, the controlling control unit 104 adds information on the drone 200 to the entering drone information so as to indicate that the drone 200 is entering. After that, when receiving entry notification from the drone 200, the controlling control unit 104 updates the entering drone information by adding entry notification time to the information on the drone 200 in the entering drone information.

Meanwhile, when it is determined that any other drone 200 is entering, the controlling control unit 104 transmits a standby instruction to the drone 200 that has transmitted the entry application. Then, the controlling control unit 104 updates the entry application pending drone information (see FIG. 8) managed by the exclusive controlled airspace entry management unit 103 by adding the information on the drone 200 to the entry application pending drone information so as to indicate that the entry application made by the drone 200 is pending.

Furthermore, for example, when receiving an exit application to leave certain exclusive controlled airspace from a certain drone 200, the controlling control unit 104 determines whether or not there is any other drone 200 around the drone 200. When it is determined that there is any other drone 200 in the surroundings, a standby instruction is transmitted to the drone 200.

Meanwhile, when it is determined that there is no other drone 200 in the surroundings, the controlling control unit 104 transmits exit permission to the drone 200 that has transmitted the exit application or the drone 200 to which the standby instruction has been transmitted. After that, when receiving exit notification from the drone 200, the controlling control unit 104 updates the entering drone information (see FIG. 7) managed by the exclusive controlled airspace entry management unit 103, by deleting information on the drone 200 from the entering drone information so as to indicate that there is no other drone 200 entering.

Note that the width W of airspace referred to here as "surroundings" may be determined in consideration of, for example, the average moving speed of the drone 200, the average moving speeds of other drones 200, and intervals at which these drones attempt to communicate with the control system 100. For example, assuming that the estimated moving speeds of the drone 200 and other drones 200 are each 10 [m/s], communication is attempted at intervals of 1 [s], and communication is attempted three times before communication is established in the airspace referred to as "surroundings", the width W is defined as shown in formula (2) below.

$$W=10 \text{ [m/s]} \times 1 \text{ [s]} \times 3 \text{ [times]}=30 \text{ [m]} \qquad (2)$$

Furthermore, when receiving the exit notification from the drone 200 that has transmitted the exit application, the controlling control unit 104 determines whether or not there is any drone 200 with a pending entry application on the basis of the entry application pending drone information (see FIG. 8) managed by the exclusive controlled airspace entry management unit 103. In a case where there are drones 200 with pending entry applications, the controlling control unit 104 transmits entry permission to one of the drones 200 having been put in a waiting state earliest.

Note that in a case where the drone 200 enters the exclusive controlled airspace without submitting an entry application and receiving entry permission from the control system 100, the control system 100 may transmit a warning or a forced landing signal to the drone 200. The drone 200 periodically reports its own location to the control system 100. Accordingly, the control system 100 can find that the drone 200 has entered the exclusive controlled airspace without permission, on the basis of a self-location report provided by the drone 200 flying in the entry/exit control area.

In addition, it is also conceivable that an exit application or exit notification may not reach the control system 100 from the exclusive controlled airspace for a long period of time after the drone 200 has entered the exclusive controlled airspace, in the event of trouble or the like. As a measure against such a case, in a case where, for example, no exit application or exit notification is received even after the elapse of a certain period of time such as the endurance of the relevant drone 200 (the control system is notified of the endurance when a flight plan is submitted) since entry notification was provided, the control system 100 may determine that there remains no drone 200 flying in the exclusive controlled airspace and perform control again in such a way as to allow another drone to enter the exclusive controlled airspace.

Configuration Example of Drone

FIG. 9 shows a configuration example of the drone 200. Part or all of the processing of each unit in the drone 200 can be implemented by software processing to be performed by a computer. The drone 200 includes a communication unit 201, a self-location estimation unit 202, a controlled airspace storage unit 203, a flight plan storage unit 204, a flight control unit 205, and an airframe control unit 206.

The communication unit 201 communicates with the control system 100. The communication unit 201 transmits data as requested by internal blocks, and receives data transmitted from the control system 100. In this case, the communication unit 201 may communicate with the control system 100 directly or via a base station, a terrestrial line such as a public line, or an Internet network. Furthermore, the communication unit 201 also communicates with a control terminal to be used by an operator of the drone 200 for performing operation.

The self-location estimation unit 202 measures the self-location of the drone 200. For example, the global positioning system (GPS) or an electronic compass is used to measure the self-location. The self-location measured by the self-location estimation unit 202 is reported to the control system 100 periodically, for example, at 1-second intervals, via the communication unit 201.

The controlled airspace storage unit 203 stores controlled airspace information on exclusive controlled airspace and the like. This controlled airspace information may be received from the exclusive controlled airspace management unit 102 of the control system 100 via the communication unit 201 or via other communication means such as the Internet. Alternatively, the controlled airspace information may be downloaded from the Internet or the like onto a PC or the like, and stored in a storage medium such as an SD card such that it is possible to use the controlled airspace information by mounting the storage medium inside the drone 200.

The flight plan storage unit 204 stores a flight plan (flight path) set by the operator of the drone 200 and a path changed by the flight control unit 205 by addition of a waypoint to the flight plan. Here, the waypoint includes positional information, such as latitude, longitude, and altitude, and attribute information indicating the type of waypoint.

The flight plan includes a list of waypoints arranged in chronological order. When a waypoint is added to this flight plan, the waypoint is inserted immediately after an immediately preceding waypoint that the drone 200 will pass so as to maintain the chronological order of the waypoints in the list.

The types of waypoints include a start, a goal, and a transit point to be passed. The transit point is set between the start and goal. These waypoints are set by the operator of the drone 200. That is, these waypoints are included in the flight plan (flight path) set by the operator.

In addition, the types of waypoints include an entry application point, an entry waiting point, an entry notification point, an exit application point, and an exit notification point for exclusive controlled airspace. The entry application point is a point where the drone 200 applies to the control system 100 for an entry into the exclusive controlled airspace. The entry waiting point is a point where the drone 200 waits when in response to the entry application for an entry into the exclusive controlled airspace, the control system 100 instructs the drone 200 to wait. The entry notification point is a point where the drone 200 notifies the control system 100 that the drone 200 has entered the exclusive controlled airspace. The exit application point is a point where the drone 200 applies to the control system 100 for an exit from the exclusive controlled airspace. The exit notification point is a point where the drone 200 notifies the control system 100 that the drone 200 has left the exclusive controlled airspace.

These waypoints for the exclusive controlled airspace are set as a result of, for example, a check of intersection performed by the flight control unit 205 on the basis of the flight plan (flight path) set by the operator and the exclusive controlled airspace received from the control system 100. These settings are updated at the timings at which the flight plan (flight path) and the exclusive controlled airspace are updated. Note that these waypoints for the exclusive controlled airspace may be set by the controlling control unit 104 of the control system 100 when the drone 200 submits a flight plan, and the flight plan may be returned to the drone 200 after being changed.

Figure 10:
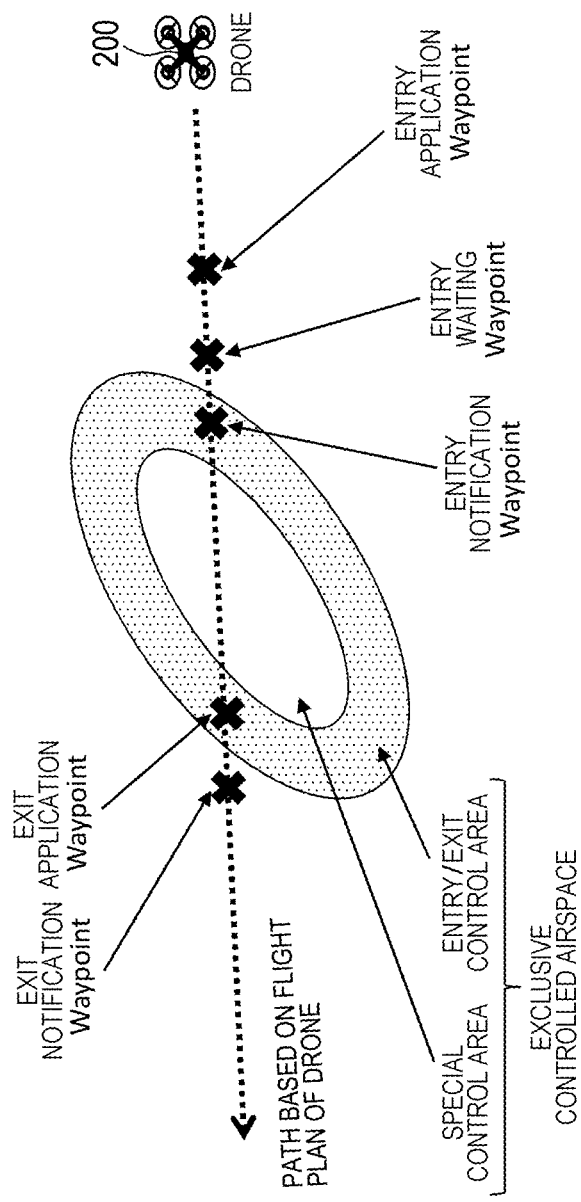
FIG. 10 is a diagram showing the approximate position of each waypoint set on a flight path of the drone that intersects the exclusive controlled airspace.

FIG. 10 shows the approximate positions of the entry application point, the entry waiting point, the entry notification point, the exit application point, and the exit notification point set on the flight path of the drone 200 that intersects the exclusive controlled airspace.

The entry waiting point is set at a position immediately before a point where the drone 200 enters the exclusive controlled airspace on the path of the flight plan. In addition, the entry application point is set at a position before the entry waiting point on the path of the flight plan in consideration of a distance that allows the drone 200 to decelerate and stop and time needed by the control system 100 to respond to the entry application.

The entry notification point is set at a position within the entry/exit control area immediately after a point where the drone 200 enters the exclusive controlled airspace on the path of the flight plan. As described above, in the entry/exit control area, the drone 200 can communicate with the control system 100 and also report its own location to the control system 100.

The exit application point is set at a position within the entry/exit control area immediately before a point where the drone 200 leaves the exclusive controlled airspace on the path of the flight plan. The exit notification point is set at a position immediately after a point where the drone 200 leaves the exclusive controlled airspace on the path of the flight plan.

FIG. 11 shows a list of the types of waypoints. Waypoints of the start, goal, and transit point are set by the operator when the flight plan is set as described above. In addition, the waypoints of the entry application point, entry waiting point, entry notification point, exit application point, and exit notification point for the exclusive controlled airspace are set by a system (the flight control unit 205 of the drone 200 or the controlling control unit 104 of the control system 100) when the flight plan is set as described above.

The flight control unit 205 manages execution of the flight plan and the progress of the flight plan. The flight control unit 205 checks whether or not a path set by the flight plan has entered the exclusive controlled airspace on the basis of the flight plan read from the flight plan storage unit and information on the exclusive controlled airspace read from the controlled airspace storage unit 203. Then, the flight control unit 205 generates the above-described waypoints for the exclusive controlled airspace, that is, the entry application point, the entry waiting point, the entry notification point, the exit application point, and the exit notification point (see FIG. 10), and adds the waypoints to the flight plan via the flight plan storage unit 204.

During flight, the flight control unit 205 determines a waypoint to which the drone 200 should move next, and informs the airframe control unit 206 of the waypoint. In addition, the flight control unit 205 determines whether the drone 200 has arrived at a waypoint to which the drone 200 is currently seeking to move, on the basis of a completion report from the airframe control unit 206 and a current self-location estimated by the self-location estimation unit 202. In addition, the flight control unit 205, for example, submits an entry application to the control system 100 via the communication unit 201, or instructs the airframe control unit 206 to stop at a waypoint corresponding to a standby position when there is received a standby instruction to wait, according to the attribute information on a waypoint.

The airframe control unit 206 receives, from the flight control unit 205, information on the waypoint to which the drone 200 should move next, and drives a propeller by controlling a motor in such a way as to move the drone 200 to a position specified by the waypoint.

"Preparatory Operation for Performing Control"

A description will be given of preparatory operation for performing control by using a combination of the control system 100 and the drone 200.

A flight plan is set in advance for the drone 200 by the operator of the drone 200, and details thereof are stored in the flight plan storage unit 204. The controlled airspace information stored in the controlled airspace storage unit 203 in the drone 200 is also updated with latest information before flight. In addition, the controlled airspace information may be updated with the latest information as needed on the basis of a regular update check or update notification from the control system 100.

At the timing when the flight plan or the controlled airspace information is updated, the flight control unit 205 of the drone 200 checks the intersection of the path set in the flight plan and the exclusive controlled airspace. In a case where the path set in the flight plan intersects the exclusive controlled airspace, the flight control unit 205 generates five waypoints as waypoints needed to pass through the exclusive controlled airspace, that is, the entry application point, the entry waiting point, the entry notification point, the exit application point, and the exit notification point (see FIG. 10), and adds the waypoints to the flight plan.

In the above operation, recognition of the controlled airspace and generation of waypoints needed to enter/leave the exclusive controlled airspace are performed on the drone 200 side. Meanwhile, when the drone 200 submits the flight plan to the control system 100, a check of the intersection of the path of the flight plan and the exclusive controlled airspace and generation of waypoints may be performed on the control system 100 side, and then, a modified version of the flight plan may be returned to the drone 200. In that case, in the control system 100, the controlling control unit 104 receives the flight plan via the communication unit 101, and the controlling control unit 104 generates the waypoints needed to enter/leave the exclusive controlled airspace, and modifies the flight plan in place of the flight control unit 205 of the drone 200.

In addition, in a case where the exclusive controlled airspace is set according to the flight plan as shown in FIG. 3 or 4, the flight plan is first submitted to the control system 100 from the drone 200, or submitted by the operator of the drone 200 by means of the Internet or the like, and then, exclusive controlled airspace is generated by the control system 100. After that, as described above, the waypoints needed to enter/leave the exclusive controlled airspace are generated in the drone 200 or the control system 100.

"Control Sequence"

Regarding a control sequence to be performed when the drones 200 pass through the exclusive controlled airspace, operation of the control system 100 and the drones 200 will be described on the basis of the situation shown in FIG. 12 taken as an example. The example of FIG. 12 is based on the assumption that the drone 200A and the drone 200B are each flying on the basis of a flight plan to pass through exclusive controlled airspace X, and the drone A is closer to the exclusive controlled airspace X, and passes through the exclusive controlled airspace X earlier.

Figure 12:
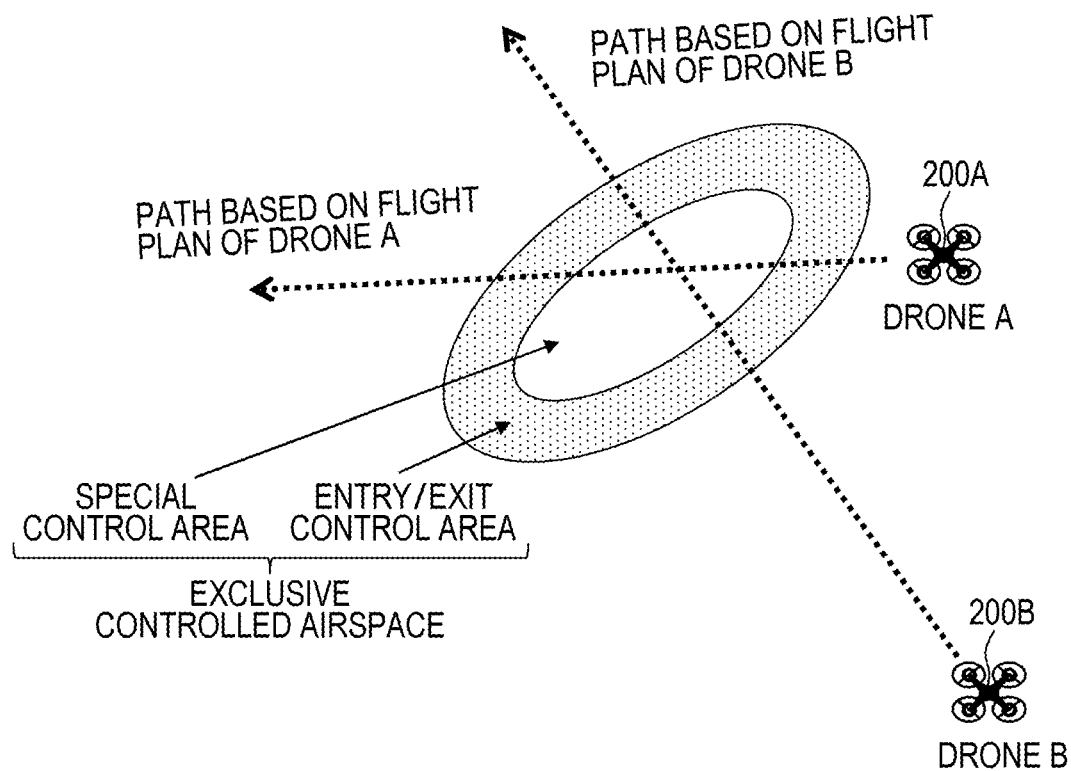
FIG. 12 is a diagram for describing a control sequence to be performed when drones pass through the exclusive controlled airspace.
Figure 13:
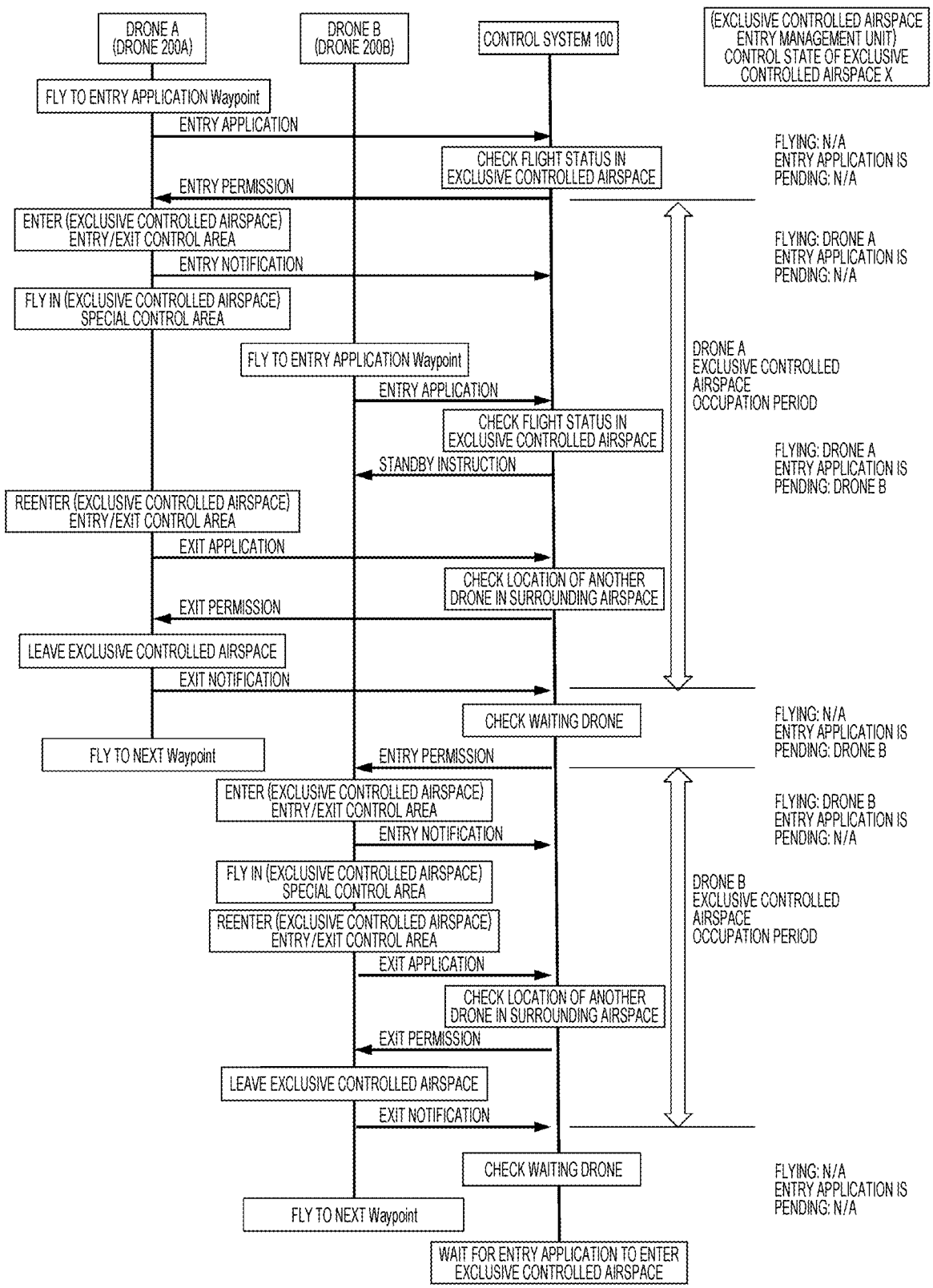
FIG. 13 is a sequence diagram showing the flow of operation to be performed until two drones under the control of a surveillance system complete passing through the exclusive controlled airspace.

A sequence diagram of FIG. 13 shows the flow of operation to be performed until the drone 200A and the drone 200B complete passing through the exclusive controlled airspace X in the situation shown in FIG. 12. In the following description, the drone 200A and the drone 200B will be referred to as the drone A and the drone B, respectively.

First, the flow of operation to be performed when the drone A passes through the exclusive controlled airspace X will be described from a viewpoint of the drone A. When the drone A approaches the exclusive controlled airspace X and flies to an entry application waypoint (see FIG. 12), the drone A submits an entry application to the control system 100. The drone A transmits data including the following items at the time of application.

Airspace ID for identifying exclusive controlled airspace that the drone will enter Estimated entry time Estimated exit time When the controlling control unit 104 receives the entry application via the communication unit 101, the control system 100 checks with the control area entry management unit 103 about the flight status of the relevant exclusive controlled airspace, that is, about a drone entering the relevant exclusive controlled airspace.

In a case where there is no entering drone, the controlling control unit 104 grants permission to the entry application, and notifies the drone A of the entry permission via the communication unit 101. When notifying the drone A of the entry permission, the control system 100 adds information on the drone A to entering drone information for the exclusive controlled airspace X in the exclusive controlled airspace entry management unit 103 so as to indicate that the drone A is entering. After that, the control system 100 performs control on the assumption that the drone A is flying in the exclusive controlled airspace X and cannot perform wireless communication until correspondence on exit notification of an exit from the exclusive controlled airspace X is received.

Figure 14:
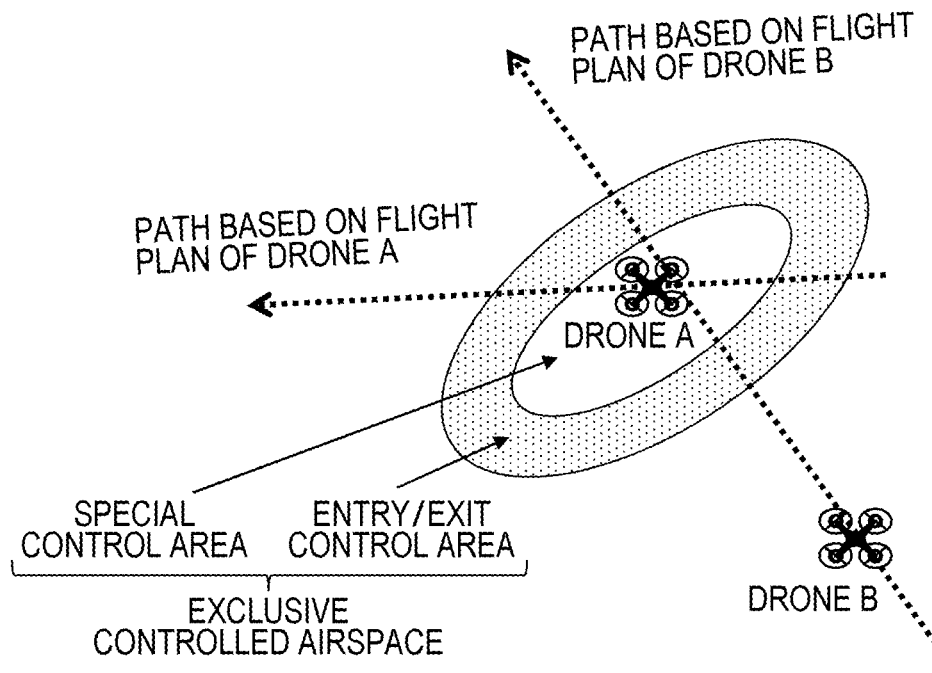
FIG. 14 is a diagram for describing the control sequence to be performed when the drones pass through the exclusive controlled airspace.

Upon receiving the entry permission, the drone A enters the entry/exit control area of the exclusive controlled airspace X, and transmits entry notification to the control system 100. After transmitting the entry notification, the drone A enters the special control area of the exclusive controlled airspace X on the basis of the flight plan, and continues the flight (see FIG. 14). In addition, upon receiving the entry notification, the control system 100 updates the entering drone information by adding entry notification time to the information on the drone A in the entering drone information.

If the drone A continues to fly, the drone A will pass through the special control area and enter the entry/exit control area on the outer circumference again. In this area, it becomes possible to communicate with the control system 100 again, so that an exit application will be transmitted so as to put the drone A under normal control again. When submitting the exit application, the drone A transmits its own current location to the control system 100.

The control system 100 checks whether or not there is any other drone having a near miss in the direction of a path specified in the flight plan submitted by the drone A, on the basis of the self-location of the drone A transmitted simultaneously with the exit application and the locations of other drones under control. Then, when there is no other drone having a near miss, the control system 100 transmits exit permission to the drone A. Meanwhile, when there is any other drone having a near miss, the control system 100 transmits a standby instruction to the drone A. In a case where the control system 100 has transmitted the standby instruction, the control system 100 transmits exit permission to the drone A after that in a state where there remains no other drone having a near miss.

Figure 15:
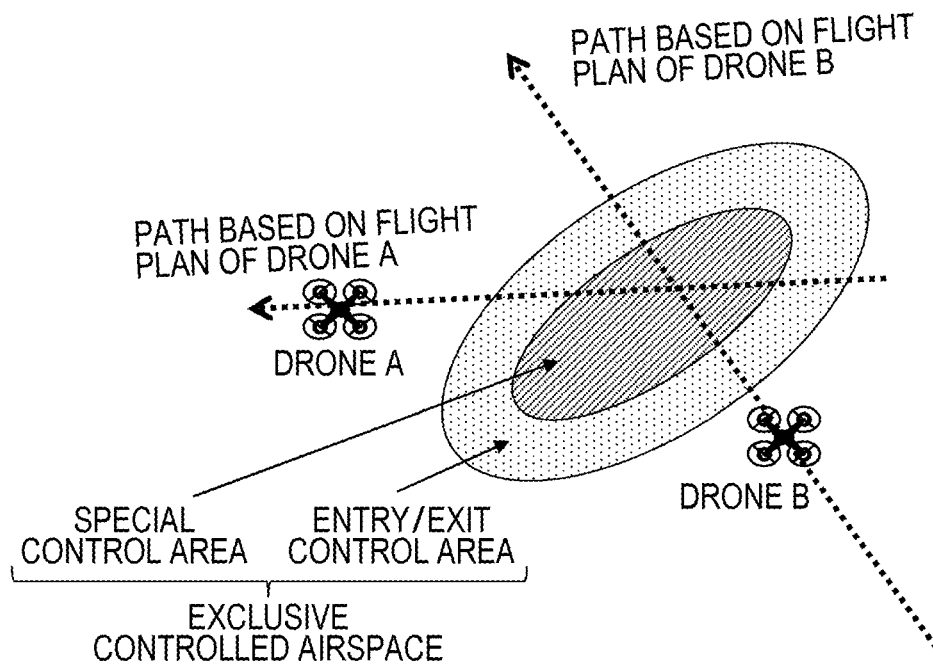
FIG. 15 is a diagram for describing the control sequence to be performed when the drones pass through the exclusive controlled airspace.

In response to the exit permission from the control system 100, the drone A leaves the exclusive controlled airspace, and flies toward the next waypoint set in the flight plan (see FIG. 15) after transmitting exit notification to the control system 100.

Next, the flow of operation to be performed when the drone B passes through the exclusive controlled airspace X will be described from a viewpoint of the drone B. As with the drone A, when the drone B approaches the exclusive controlled airspace X and flies to the entry application waypoint (see FIG. 14), the drone B submits, to the control system 100, an entry application to enter the exclusive controlled airspace X.

However, at this time, since the drone A is already entering the exclusive controlled airspace X, the control system 100 does not issue entry permission, but instead transmits a standby instruction to the drone B. Furthermore, the control system 100 adds the drone B to the entry application pending drone information for the exclusive controlled airspace X in the exclusive controlled airspace entry management unit 103. Note that, as described above, the entry application pending drone information is managed as a FIFO queue. When the standby instruction is provided, the drone B stops itself immediately before entering the exclusive controlled airspace X, and waits for an instruction from the control system 100.

When the control system 100 receives the exit notification from the drone A entering the exclusive controlled airspace X earlier, the controlling control unit 104 deletes the entering drone information stored in the exclusive controlled airspace entry management unit 103. In addition, the controlling control unit 104 obtains information on an entry waiting drone at the head of the FIFO queue of the entry application pending drone information, and provides entry permission to the entry waiting drone. In this example, the entry waiting drone corresponds to the drone B, so that the control system 100 notifies the drone B of the entry permission. When providing notification of the entry permission, the control system 100 adds information on the drone B to the entering drone information for the exclusive controlled airspace X in the exclusive controlled airspace entry management unit 103 so as to indicate that the drone B is entering Upon receiving the entry permission, the drone B enters the entry/exit control area of the exclusive controlled airspace X, and transmits entry notification to the control system 100. After transmitting the entry notification, the drone B enters the special control area of the exclusive controlled airspace X on the basis of the flight plan, and continues the flight. In addition, upon receiving the entry notification, the control system 100 updates the entering drone information by adding entry notification time to the information on the drone B in the entering drone information.

After that, as in the case of the drone A, the drone B passes through the exclusive controlled airspace X under the control of the control system 100.

"Processing Procedure to be Executed by Control System in Case where Entry Application is Received"

Figure 16:
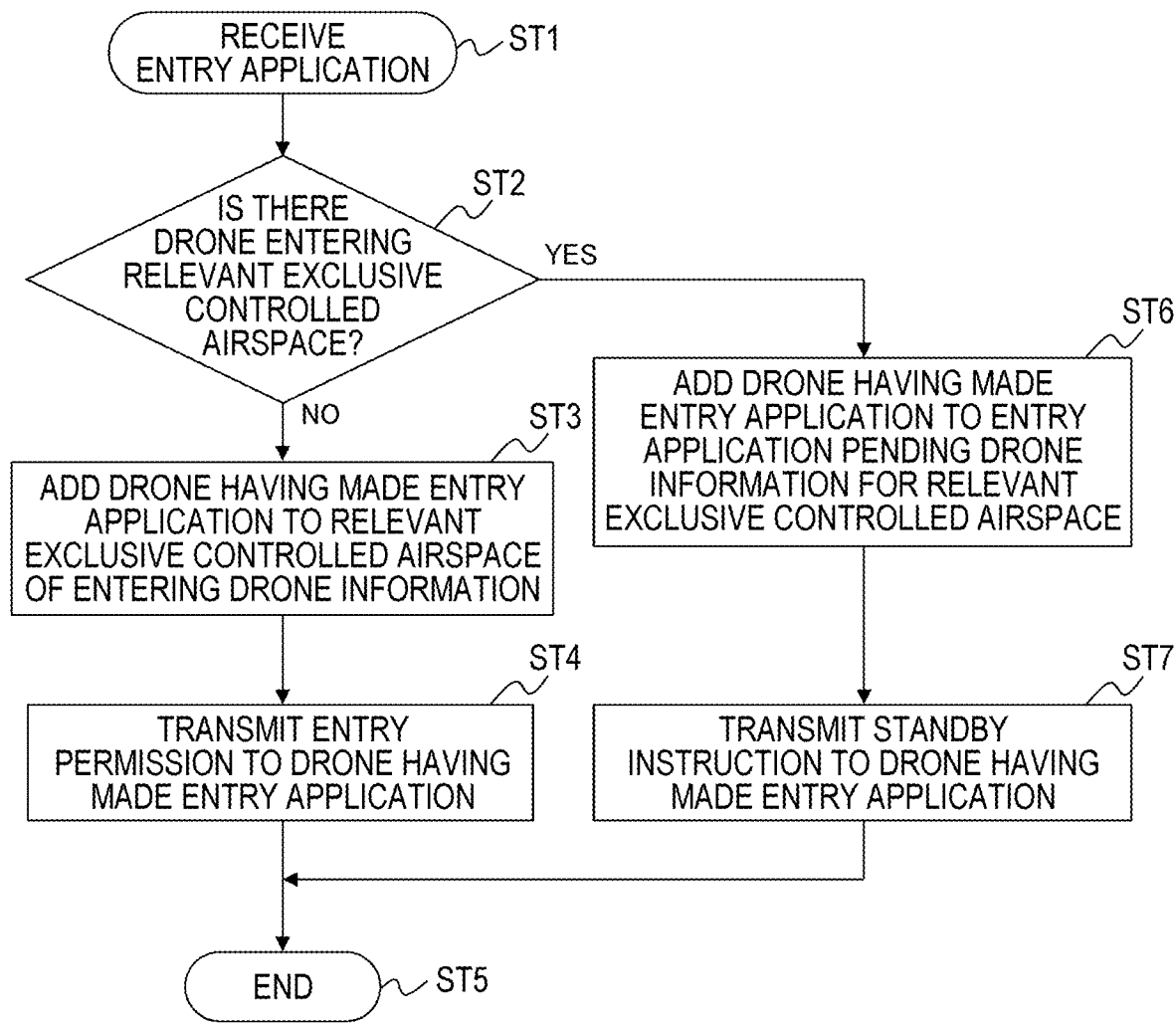
FIG. 16 is a flowchart showing an example of a processing procedure to be executed by the control system in a case where an entry application is received.

A flowchart of FIG. 16 shows an example of a processing procedure to be executed by the control system 100 in a case where an entry application is received. When receiving an entry application from the drone 200 in step ST1, the control system 100 determines in step ST2 whether or not there is any drone 200 entering relevant exclusive controlled airspace.

When there is no entering drone 200, the control system 100 adds information on the drone 200 having made the entry application to the relevant exclusive controlled airspace of the entering drone information (see FIG. 7) in step ST3. Then, in step ST4, the control system 100 transmits entry permission to the drone 200 having made the entry application. After that, the control system 100 ends the process in step ST5.

Furthermore, when there is any entering drone 200 in step ST2, the control system 100 adds the drone 200 having made the entry application to the relevant exclusive controlled airspace of the entry application pending drone information (see FIG. 8) in step ST6. Then, in step ST7, the control system 100 transmits a standby instruction to the drone 200 having made the entry application. After that, the control system 100 ends the process in step ST5. Note that in the process of the flowchart of FIG. 16, entering flight vehicle information for the exclusive controlled airspace is updated when entry permission is transmitted to the drone 200. Meanwhile, in a case where an entry application is received from a drone 200 seeking to enter the exclusive controlled airspace, the entering flight vehicle information for the exclusive controlled airspace may be updated when no other drone 200 has entered the exclusive controlled airspace, when entry permission is transmitted to the drone 200, or when entry notification is received from the drone 200.

"Processing Procedure to be Executed by Control System in Case where Entry Notification is Received"

Figure 17:
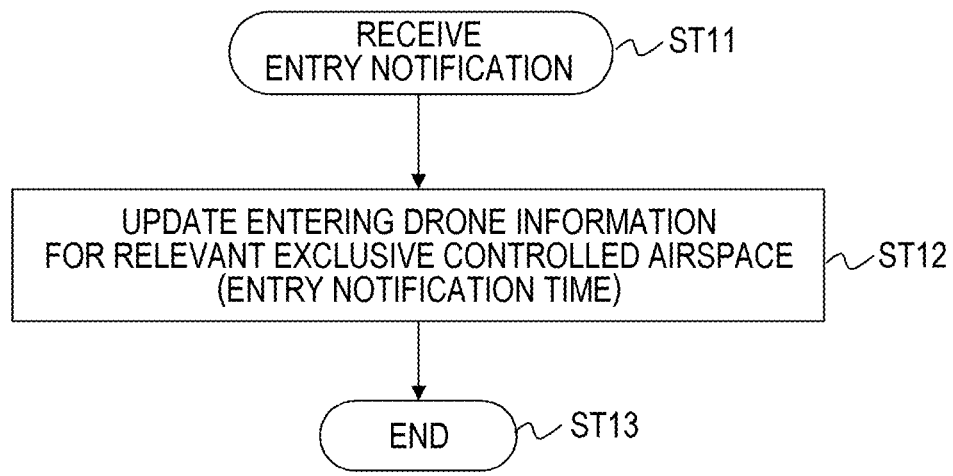
FIG. 17 is a flowchart showing an example of a processing procedure to be executed by the control system in a case where entry notification is received.

A flowchart of FIG. 17 shows an example of a processing procedure to be executed by the control system 100 in a case where entry notification is received. When receiving entry notification from the drone 200 in step ST11, the control system 100 updates the entering drone information for the relevant exclusive controlled airspace in step ST12. In this case, entry notification time is added to information on the drone 200 in the entering drone information (see FIG. 7) to update the entering drone information. After that, the control system 100 ends the process in step ST13. Note that it is possible to perform control according to the present technology without any entry notification. Providing entry notification enables a timeout to be set for entry permission, so that the entry permission can be revoked in a case where no notification is returned within a certain period of time. In this case, it is possible to set shorter time different from a timeout for time taken to pass through the exclusive controlled airspace, so that it is possible to improve time utilization efficiency at the time of anomalies.

"Processing Procedure to be Executed by Control System in Case where Exit Application is Received"

Figure 18:
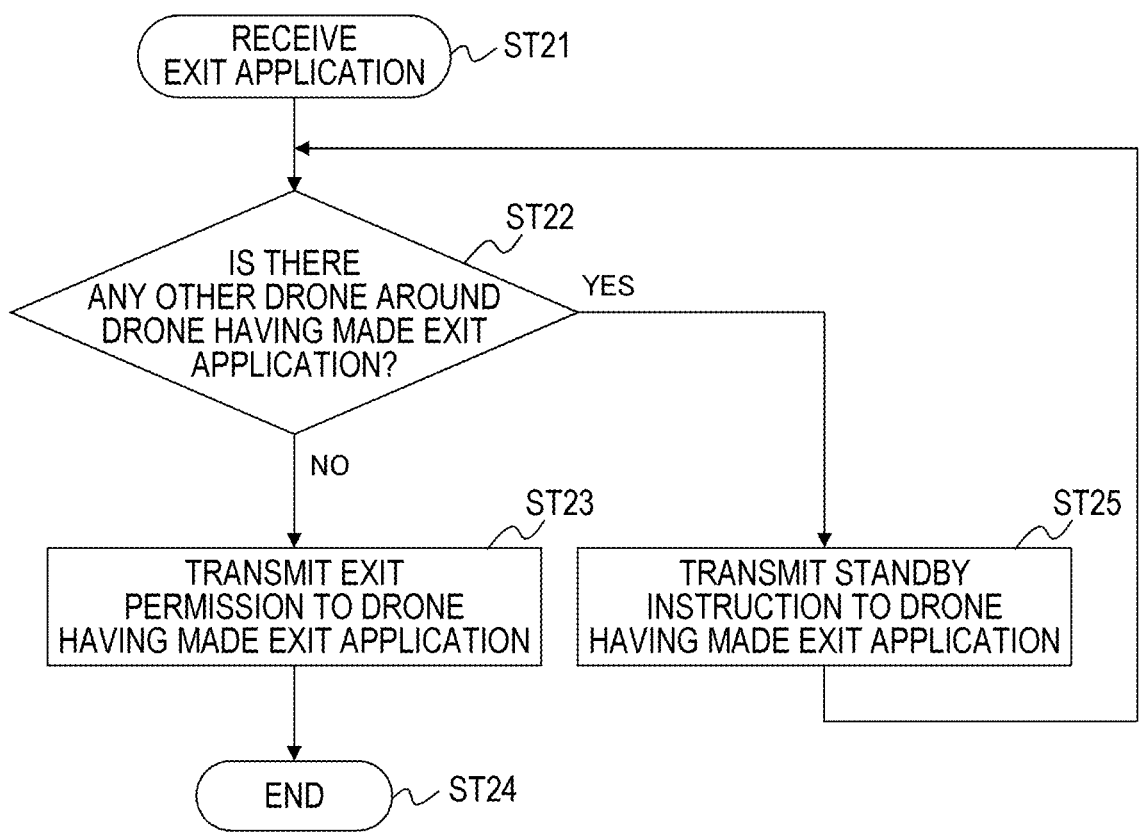
FIG. 18 is a flowchart showing an example of a processing procedure to be executed by the control system in a case where an exit application is received.

A flowchart of FIG. 18 shows an example of a processing procedure to be executed by the control system 100 in a case where an exit application is received. When receiving an exit application from the drone 200 in step ST21, the control system 100 determines in step ST22 whether or not there is any other drone 200 around the drone 200 having made the exit application.

When there is no other drone 200 in the surroundings, the control system 100 transmits exit permission to the drone 200 having made the exit application in step ST23. After that, the control system 100 ends the process in step ST24.

Furthermore, when there is any other drone 200 in the surroundings in step ST22, the control system 100 transmits a standby instruction to the drone 200 having made the exit application in step ST25. After that, the control system 100 returns to the processing of step ST22, and performs processing similar to that described above.

"Processing Procedure to be Executed by Control System in Case where Exit Notification is Received"

Figure 19:
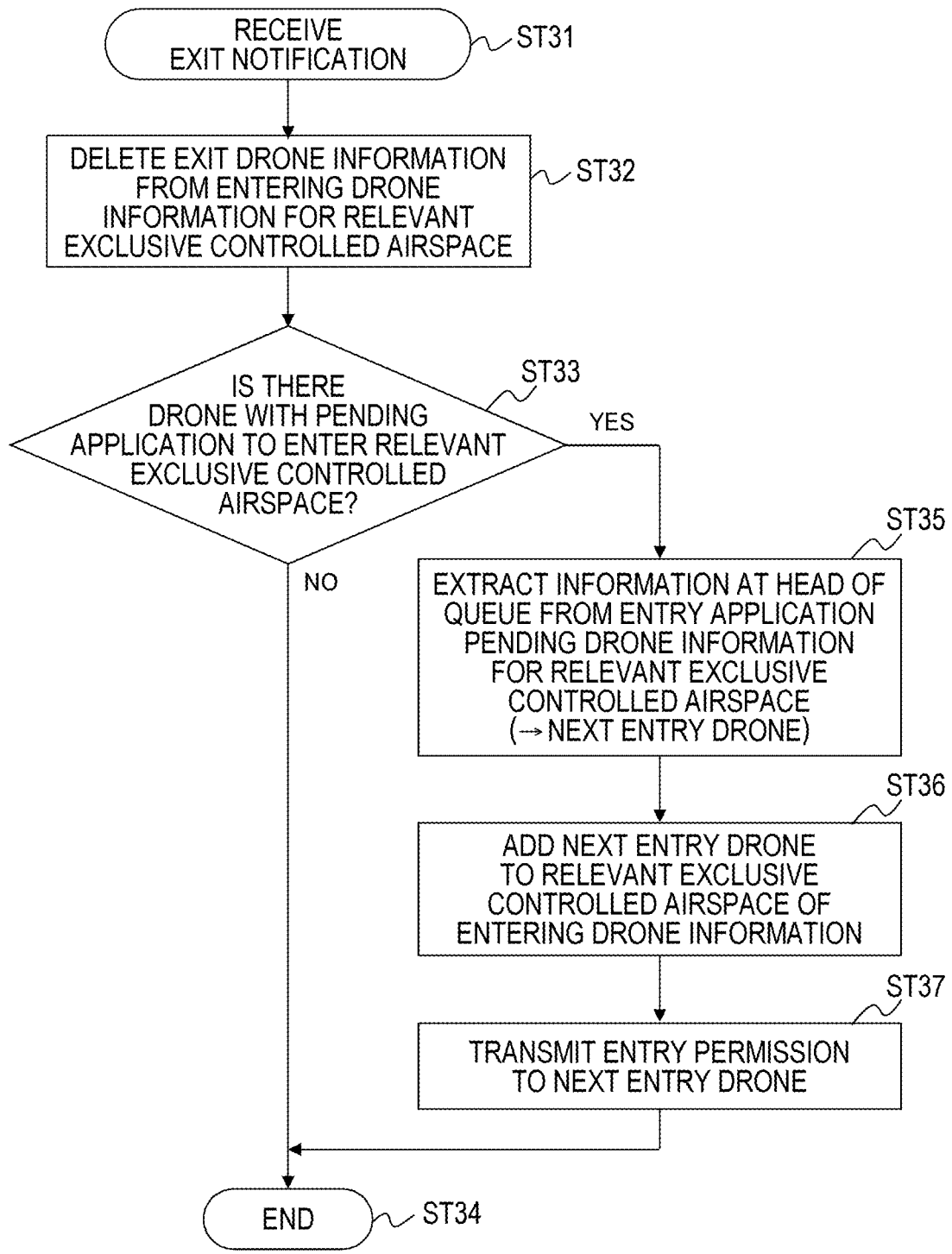
FIG. 19 is a flowchart showing an example of a processing procedure to be executed by the control system in a case where exit notification is received.

A flowchart of FIG. 19 shows an example of a processing procedure to be executed by the control system 100 in a case where exit notification is received. When receiving exit notification from the drone 200 in step ST31, the control system 100 deletes exit drone information from the entering drone information (see FIG. 7) for the relevant exclusive controlled airspace in step ST32.

Next, in step ST33, the control system 100 determines whether there is any drone 200 with a pending application to enter the relevant exclusive controlled airspace. When there is no drone 200 with a pending entry application, the control system 100 ends the process in step ST34.

When there is any drone 200 with a pending entry application in step ST33, the control system 100 extracts information on a drone at the head of the queue from the entry application pending drone information for the relevant exclusive controlled airspace in step ST35, and sets the drone as a next entry drone 200. Next, in step ST36, the control system 100 adds information on the next entry drone 200 to the relevant exclusive controlled airspace of the entering drone information (see FIG. 7). Then, in step ST37, the control system 100 transmits entry permission to the next entry drone 200. After that, the control system 100 ends the process in step ST34. Note that although, in the process of the flowchart of FIG. 19, the entering flight vehicle information for the exclusive controlled airspace is updated when exit notification is received from the drone 200 to which exit permission has been transmitted, the entering flight vehicle information for the exclusive controlled airspace may be updated when an exit application is received from a drone 200 seeking to leave the exclusive controlled airspace, when exit permission is transmitted to the drone 200, or when exit notification is received from the drone 200 to which the exit permission has been transmitted.

As described above, in the flight vehicle system 10 shown in FIG. 1, the control system 100 performs control such that only a single drone 200 enters the special control area where the drone 200 cannot report its own location. Therefore, it is possible to allow the drone 200 to safely fly even in the special control area, so that the special control area can be used effectively. In this case, even if the flight plans of two or more drones 200 intersect each other in the special control area, it is possible to allow each drone 200 to safely fly without causing a risk of collision.

2. Second Embodiment

The first embodiment described above is based on the assumption that only a single drone can enter the exclusive controlled airspace. However, in a case where a drone itself has the ability to avoid other flight vehicles so as to avoid collisions with other flight vehicles, the drone can safely fly even without any support from air traffic control if the density of drones in the exclusive controlled airspace does not exceed a certain level. Therefore, control may be performed in such a way as to permit a plurality of drones to fly in a single exclusive controlled airspace if the drones each have the ability to avoid other flight vehicles.

Although not shown, a flight vehicle system 10 in a second embodiment also includes a control system 100 and a predetermined number of drones 200 existing in airspace to be controlled by the control system 100 (see FIG. 1) as in the first embodiment described above.

The outline of a control policy to be implemented in the flight vehicle system 10 in the second embodiment is as follows. That is, in a case where a drone that does not have the ability to avoid other flight vehicles has entered exclusive controlled airspace, the upper limit for the number of drones in the exclusive controlled airspace is set to one while the drone that does not have the ability to avoid other flight vehicles is in the exclusive controlled airspace.

In addition, in a case where a drone that has the ability to avoid other flight vehicles has entered exclusive controlled airspace, a drone that does not have the ability to avoid other flight vehicles is not permitted to enter the exclusive controlled airspace. That is, the drone that does not have the ability to avoid other flight vehicles is not allowed to enter the exclusive controlled airspace until all the other drones that have already entered the exclusive controlled airspace leave the exclusive controlled airspace.

In addition, in a case where a drone having the ability to avoid other flight vehicles has entered exclusive controlled airspace, another drone having the ability to avoid other flight vehicles is permitted to enter the exclusive controlled airspace. In this case, the upper limit for the number of drones to be permitted to enter the exclusive controlled airspace may be set on the controller side in consideration of the density of drones in the exclusive controlled airspace.

Although illustration and detailed description are omitted, the configuration of the control system 100 in the second embodiment is assumed to be similar to the configuration of the control system 100 in the first embodiment described above (see FIG. 6). Furthermore, although illustration and detailed description are omitted, the configuration of the drone 200 that does not have the ability to avoid other flight vehicles in the second embodiment is assumed to be similar to the configuration of the drone 200 in the first embodiment described above (FIG. 9).

Figure 20:
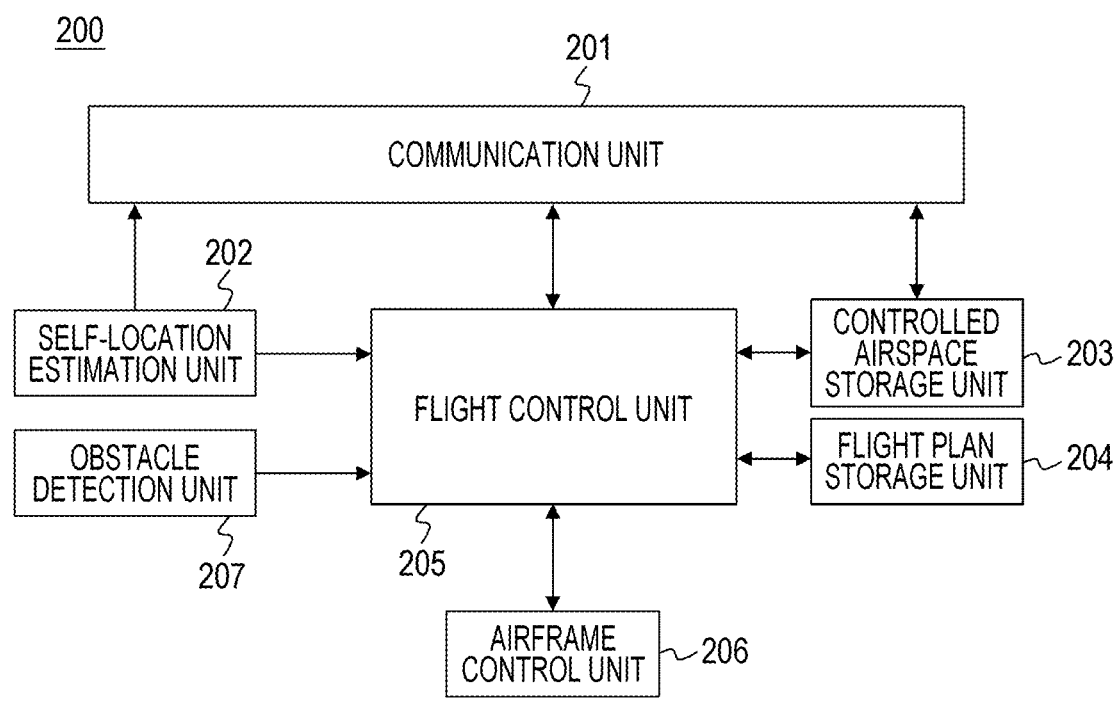
FIG. 20 is a block diagram showing a configuration example of a drone having the ability to avoid other flight vehicles.

FIG. 20 shows a configuration example of the drone 200 having the ability to avoid other flight vehicles in the second embodiment. In FIG. 20, parts corresponding to those in FIG. 9 are denoted by the same reference numerals, and detailed description thereof will be omitted as appropriate.

The drone 200 includes an obstacle detection unit 207 in addition to a communication unit 201, a self-location estimation unit 202, a controlled airspace storage unit 203, a flight plan storage unit 204, a flight control unit 205, and an airframe control unit 206.

The obstacle detection unit 207 detects an obstacle around a drone and other flying drones. Sensors (not shown) such as a radar, a camera, light detection and ranging (LiDAR), and time of flight (ToF) may be connected to the obstacle detection unit 207. Furthermore, the above-described detection may be implemented by the function of performing inter-drone communication (not shown) and the sharing of self-location information among a drone and drones in its surroundings.

The flight control unit 205 instructs the airframe control unit 206 to avoid collisions with an obstacle and other drones in the surroundings and head for a waypoint stored in the flight plan storage unit 204, by using information on the obstacle and other drones detected by the obstacle detection unit 207.

With these mechanisms, the drone 200 having the ability to avoid other flight vehicles can recognize the existence and locations of other drones and avoid collision on the basis only of communication between the drone 200 and the other drones even without any support from air traffic control.

In the flight vehicle system 10 in the second embodiment, items of data to be transmitted to the control system 100 when the drone 200 applies for an entry into the exclusive controlled airspace include "ability to avoid other flight vehicles" in addition to the data items in the first embodiment, that is, "airspace ID for identifying exclusive controlled airspace that the drone will enter", "estimated entry time", and "estimated exit time".

The item of "ability to avoid other flight vehicles" is information indicating whether or not the drone has the ability to avoid collision by recognizing drones flying in the surroundings only by the drone's own efforts. The item of "ability to avoid other flight vehicles" has a value according to the function/performance that each drone has. The item of "ability to avoid other flight vehicles" has two values such that, for example, the item is marked "able" if a drone has the ability, and marked "unable" if the drone does not have the ability. Furthermore, a plurality of levels (for example, level 5 to level 0) may be set according to the avoidance ability. Here, level 0 indicates that a drone does not have the ability to avoid collision by itself. Note that in a case where the item of "ability to avoid other flight vehicles" is represented by use of a plurality of levels, a drone may be considered "having the ability to avoid other flight vehicles" when the drone's ability reaches or exceeds a predetermined level.

FIG. 21 shows an example of entering drone information to be managed by an exclusive controlled airspace entry management unit 103 of the control system 100 in the flight vehicle system 10 in the second implementation. The entering drone information has been expanded so that a plurality of the drones 200 can be managed for each exclusive controlled airspace. In addition, an item related to the ability to avoid other flight vehicles has been added to the entering drone information.

This example shows that the drone 200 with the individual identification number "1234-5678-1201" which has the ability to avoid other flight vehicles and the drone 200 with the individual identification number "1254-3570-8803" which has the ability to avoid other flight vehicles are entering exclusive controlled airspace-1. Furthermore, this example shows that there is no entry of the drone 200 into exclusive controlled airspace-2. Furthermore, this example shows that the drone 200 with the individual identification number "5703-2341-3410" which does not have the ability to avoid other flight vehicles is entering exclusive controlled airspace-3.

FIG. 22 shows an example of entry application pending drone information to be managed by the exclusive controlled airspace entry management unit 103 of the control system 100 in the flight vehicle system 10 in the second implementation. An item related to the ability to avoid other flight vehicles has been added to the entry application pending drone information. In this case, information on each drone 200 is managed as a first-in first-out (FIFO) queue for each exclusive controlled airspace.

In this example, three drones 200 with the individual identification numbers "2345-1890-2305", "7823-7832-3583", and "3511-0273-7835" are waiting for entry into exclusive controlled airspace-1 in this order after submitting their respective entry applications to the control system 100. Here, the drones 200 with the individual identification numbers "2345-1890-2305" and "3511-0273-7835" do not have the ability to avoid other flight vehicles, and the drone 200 with the individual identification number "7823-7832-3583" has the ability to avoid other flight vehicles.

Furthermore, in this example, there is no drone 200 with a pending application to enter exclusive controlled airspace-2. Moreover, in this example, two drones 200 with the individual identification numbers "1345-1890-2306" and "6823-7832-3584" are waiting for entry into exclusive controlled airspace-3 in this order after submitting their respective entry applications to the control system 100. Here, the drone 200 with the individual identification number "1345-1890-2306" does not have the ability to avoid other flight vehicles, and the drone 200 with the individual identification number "6823-7832-3584" has the ability to avoid other flight vehicles.

When the drones 200 apply for entry into their respective exclusive controlled airspaces, information on each of the drones 200 is added to the end of a FIFO queue for the corresponding exclusive controlled airspace (bottom of FIG. 22). The control system 100 permits entry from the head of the FIFO queue (top in FIG. 22) for each exclusive controlled airspace. In that case, the line of information on the drone 200 given permission is deleted and all the lines of information on the other drones 200, which are located below the deleted line, are moved up.

Figure 23:
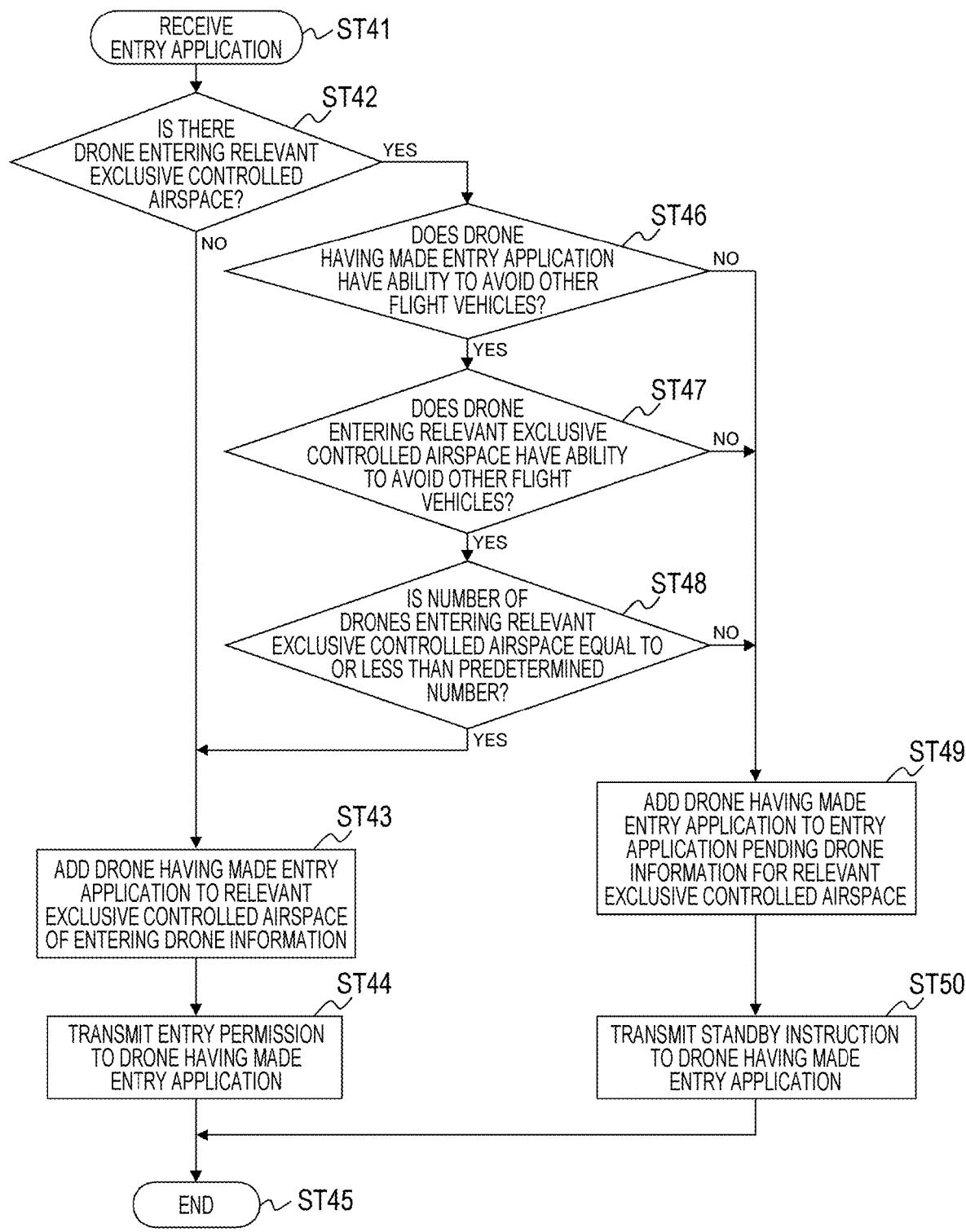
FIG. 23 is a flowchart showing an example of a processing procedure to be executed by a control system in a case where an entry application is received.
Figure 24:
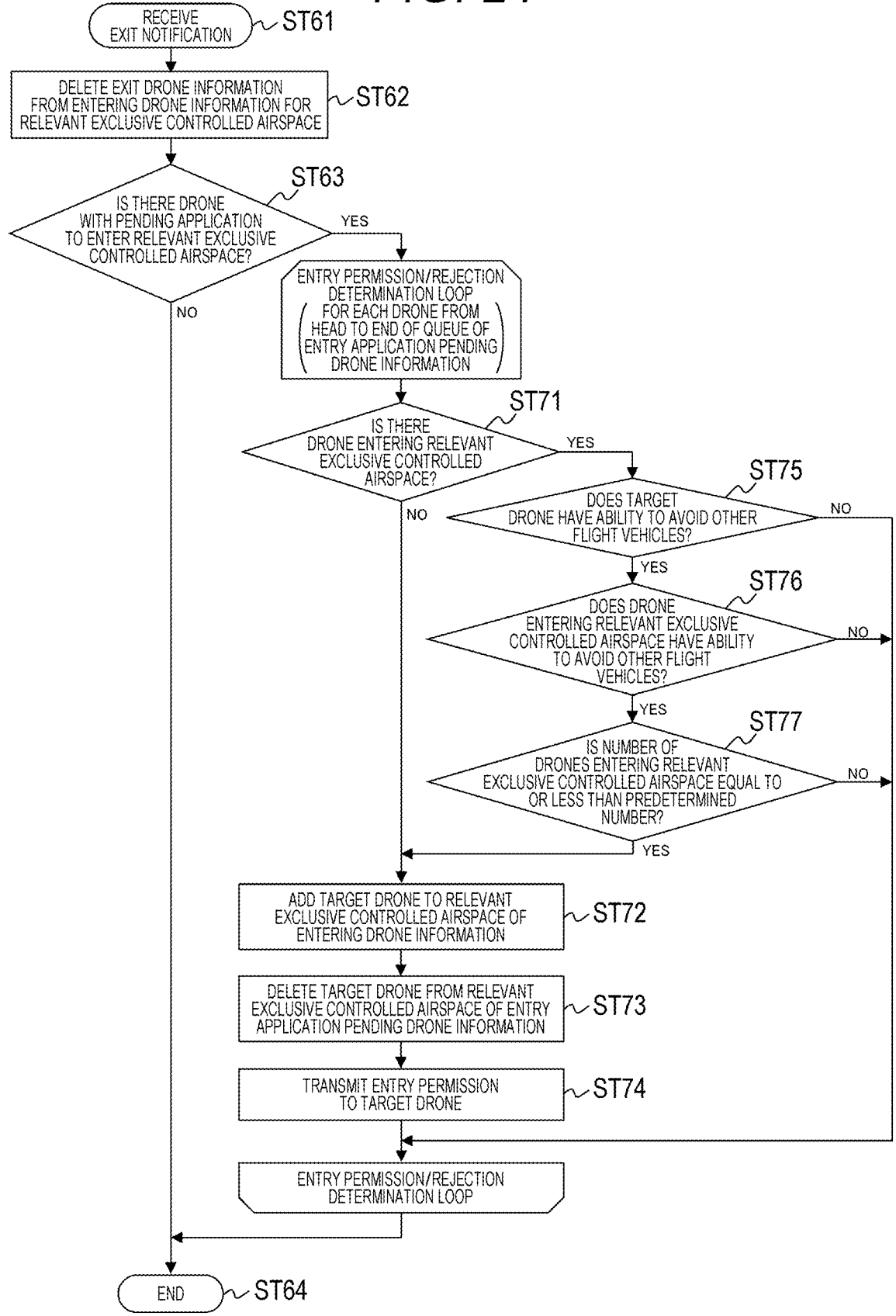
FIG. 24 is a flowchart showing an example of a processing procedure to be executed by the control system in a case where exit notification is received.

A flowchart of FIG. 23 shows an example of a processing procedure to be executed by the control system 100 in a case where an entry application is received in the flight vehicle system 10 in the second implementation. Furthermore, a flowchart of FIG. 24 shows an example of a processing procedure to be executed by the control system 100 in a case where exit notification is received in the flight vehicle system 10 in the second implementation.

Note that a processing procedure to be executed by the control system 100 in the case of receiving entry notification and a processing procedure to be executed by the control system 100 in the case of receiving an exit application in the flight vehicle system 10 in the second implementation are similar to those in the flight vehicle system 10 in the first embodiment (see FIGS. 17 and 18).

The processing procedure to be executed by the control system 100 in the case of receiving an entry application will be described with reference to the flowchart of FIG. 23. When receiving an entry application from the drone 200 in step ST41, the control system 100 determines in step ST42 whether or not there is any drone 200 entering relevant exclusive controlled airspace. In this case, the control system 100 makes a determination on the basis of the entering drone information (see FIG. 21).

When there is no entering drone 200, the control system 100 adds information on the drone 200 having made the entry application to the relevant exclusive controlled airspace of the entering drone information (see FIG. 21) in step ST43. Then, in step ST44, the control system 100 transmits entry permission to the drone 200 having made the entry application. After that, the control system 100 ends the process in step ST45.

Furthermore, when there is any entering drone 200 in step ST42, the control system 100 determines in step ST46 whether or not the drone 200 having made the entry application has the ability to avoid other flight vehicles. In this case, the control system 100 makes a determination by using information on the ability to avoid other flight vehicles received at the time of application.

When the drone 200 having made the entry application does not have the ability to avoid other flight vehicles, the control system 100 does not permit the drone 200 having made the entry application to enter so as to prevent collisions with other drones. That is, when the drone 200 having made the entry application does not have the ability to avoid other flight vehicles, the control system 100 adds the drone 200 having made the entry application to the relevant exclusive controlled airspace of the entry application pending drone information (see FIG. 22) in step ST49. Then, in step ST50, the control system 100 transmits a standby instruction to the drone 200 having made the entry application. After that, the control system 100 ends the process in step ST45.

In addition, when the drone 200 having made the entry application has the ability to avoid other flight vehicles in step ST46, the control system 100 determines in step ST47 whether or not the drone 200 that is entering the relevant exclusive controlled airspace has the ability to avoid other flight vehicles. In this case, the control system 100 makes a determination by checking, for each drone 200, the item of the ability to avoid other flight vehicles recorded in the entering drone information (see FIG. 21) for the relevant exclusive controlled airspace.

When the entering drone 200 does not have the ability to avoid other flight vehicles, the control system 100 does not permit the drone 200 having made the entry application to enter so as to prevent collisions with other drones. That is, when the entering drone 200 does not have the ability to avoid other flight vehicles, the control system 100 adds the drone 200 having made the entry application to the relevant exclusive controlled airspace of the entry application pending drone information (see FIG. 22) in step ST49, and transmits, in step ST50, a standby instruction to the drone 200 having made the entry application. After that, the control system 100 ends the process in step ST45.

In addition, when the entering drone 200 has the ability to avoid other flight vehicles in step ST47, the control system 100 determines in step ST48 whether or not the number of the drones 200 entering the relevant exclusive controlled airspace is equal to or less than a predetermined number. In this case, the control system 100 makes a determination on the basis of the number of the drones 200 recorded in the entering drone information (see FIG. 21) for the relevant exclusive controlled airspace. Note that the predetermined number may be set to a value common to all exclusive controlled airspaces. In addition, the predetermined number may be set individually for each exclusive controlled airspace. Moreover, the predetermined number may be automatically set to, for example, a value proportional to the size of the exclusive controlled airspace.

In a case where the number of the entering drones 200 has reached the predetermined number, the control system 100 determines that the density of the drones 200 flying in the exclusive controlled airspace is high, and that it is difficult to avoid collision on the basis of the ability to avoid other flight vehicles that the drone 200 has if another drone 200 enters the exclusive controlled airspace. Accordingly, the control system 100 does not permit the drone 200 having made the entry application to enter the exclusive controlled airspace. That is, when the number of the entering drones 200 has reached the predetermined number, the control system 100 adds the drone 200 having made the entry application to the relevant exclusive controlled airspace of the entry application pending drone information (see FIG. 22) in step ST49, and transmits, in step ST50, a standby instruction to the drone 200 having made the entry application. After that, the control system 100 ends the process in step ST45.

Furthermore, when the number of the entering drones 200 has not reached the predetermined number in step ST48, the control system 100 adds information on the drone 200 having made the entry application to the relevant exclusive controlled airspace of the entering drone information (see FIG. 21) in step ST43. Then, in step ST44, the control system 100 transmits entry permission to the drone 200 having made the entry application. After that, the control system 100 ends the process in step ST45.

On the basis of the process according to the flowchart of FIG. 23, even in a case where there is any drone 200 entering the relevant exclusive controlled airspace, the drone 200 having made the entry application is permitted to enter in a case where the drone 200 having made the entry application has the ability to avoid other flight vehicles, the entering drone 200 has the ability to avoid other flight vehicles, and the number of the drones 200 entering the relevant exclusive controlled airspace is equal to or less than the predetermined number. This is because the ability to avoid other flight vehicles enables the drones 200 to avoid a collision with each other in such a case. As a result, control is performed in such a way as to permit a plurality of the drones 200 to fly in a single exclusive controlled airspace in the flight vehicle system 10 in the second embodiment.

The processing procedure to be executed by the control system 100 in the case of receiving exit notification will be described with reference to the flowchart of FIG. 24. When receiving exit notification from the drone 200 in step ST61, the control system 100 deletes exit drone information from the entering drone information (see FIG. 21) for the relevant exclusive controlled airspace in step ST62.

Next, in step ST63, the control system 100 determines whether or not there is any drone 200 with a pending application to enter the relevant exclusive controlled airspace. In this case, the control system 100 makes a determination on the basis of the entry application pending drone information (see FIG. 22). When there is no drone 200 with a pending entry application, the control system 100 ends the process in step ST64.

When there is any drone 200 with a pending entry application in step ST63, the process is ended in step ST64 after the process of an entry permission/rejection determination loop is performed. In the entry permission/rejection determination loop, a process of entry permission/rejection determination is performed individually in order from the head of the FIFO queue. Note that, in the following description of the process of entry permission/rejection determination, the drone 200 for which entry determination is made is referred to as a target drone 200X as appropriate.

In step ST71, the control system 100 determines whether or not there is any drone 200 entering the exclusive controlled airspace. In this case, the control system 100 makes a determination on the basis of the entering drone information (see FIG. 21).

Note that a series of processes of entry permission/rejection determination, including processes to be described below, are sequentially performed from the head of the queue of the entry application pending drone information. Therefore, in a case where entry permission is granted to the target drone 200X processed earlier, the target drone 200X to which the entry permission has been granted is written in the entering drone information as described below. Therefore, when entry determination is made for the target drone 200X to be processed after that, processing is performed assuming that the entering drone 200 exists.

When there is no drone 200 entering the exclusive controlled airspace in step ST71, the control system 100 permits the drone 200X to enter. That is, when there is no entering drone 200, the control system 100 adds the target drone 200X to the relevant exclusive controlled airspace of the entering drone information (see FIG. 21) in step ST72.

Then, in step ST73, the control system 100 deletes the target drone 200X from the relevant exclusive controlled airspace of the entry application pending drone information (see FIG. 22). Then, in step ST74, the control system 100 transmits entry permission to the target drone 200X.

Furthermore, when there is any drone 200 entering the relevant exclusive controlled airspace in step ST71, the control system 100 determines in step ST75 whether or not the target drone 200X has the ability to avoid other flight vehicles. In this case, the control system 100 makes a determination on the basis of the entry application pending drone information (see FIG. 22).

When the target drone 200X does not have the ability to avoid other flight vehicles, the control system 100 does not permit the target drone 200X to enter so as to prevent collisions with other drones. Specifically, the process of entry permission/rejection determination for the target drone 200X is ended, and the target drone 200X is changed to a next drone 200 existing in a queue of drones with pending entry applications.

Furthermore, when the target drone 200X has the ability to avoid other flight vehicles in step ST75, the control system 100 determines in step ST76 whether or not the drone 200 entering the relevant exclusive controlled airspace has the ability to avoid other flight vehicles. In this case, the control system 100 makes a determination by checking, for each drone 200, the item of the ability to avoid other flight vehicles recorded in the entering drone information (see FIG. 21) for the relevant exclusive controlled airspace.

When the entering drone 200 does not have the ability to avoid other flight vehicles, the control system 100 does not permit the target drone 200X to enter so as to prevent collisions with other drones. Specifically, the process of entry permission/rejection determination for the target drone 200X is ended, and the target drone 200X is changed to a next drone 200 existing in a queue of drones with pending entry applications.

In addition, when the entering drone 200 has the ability to avoid other flight vehicles in step ST76, the control system 100 determines in step ST77 whether or not the number of the drones 200 entering the exclusive controlled airspace is equal to or less than the predetermined number. In this case, the control system 100 makes a determination on the basis of the number of the drones 200 recorded in the entering drone information (see FIG. 21) for the relevant exclusive controlled airspace. Note that the predetermined number (upper limit for the number of drones) may be set to a value common to all exclusive controlled airspaces. In addition, the predetermined number may be set individually for each exclusive controlled airspace. Moreover, the predetermined number may be automatically set to, for example, a value proportional to the size of the exclusive controlled airspace.

In a case where the number of the entering drones 200 has reached the predetermined number, the control system 100 determines that the density of the drones 200 flying in the exclusive controlled airspace is high, and that it is difficult to avoid collision on the basis of the ability to avoid other flight vehicles that the drone 200 has if another drone 200 enters the exclusive controlled airspace. Accordingly, the control system 100 does not permit the target drone 200X to enter the exclusive controlled airspace. Specifically, the process of entry permission/rejection determination for the target drone 200X is ended, and the target drone 200X is changed to a next drone 200 existing in a queue of drones with pending entry applications.

Furthermore, when the number of the entering drones 200 has not reached the predetermined number in step ST77, the control system 100 permits the target drone 200X to enter. That is, when the number of the entering drones 200 has not reached the predetermined number, the control system 100 adds the target drone 200X to the relevant exclusive controlled airspace of the entering drone information (see FIG. 21) in step ST72. Then, in step ST73, the control system 100 deletes the target drone 200X from the relevant exclusive controlled airspace of the entry application pending drone information (see FIG. 22). Then, in step ST74, the control system 100 transmits entry permission to the target drone 200X.

On the basis of the process according to the flowchart of FIG. 24, even in a case where there is any drone 200 entering the relevant exclusive controlled airspace, the target drone 200X is permitted to enter in a case where the target drone 200X has the ability to avoid other flight vehicles, the entering drone 200 has the ability to avoid other flight vehicles, and the number of the drones 200 entering the relevant exclusive controlled airspace is equal to or less than the predetermined number. This is because the ability to avoid other flight vehicles enables the drones 200 to avoid a collision with each other in such a case. As a result, control is performed in such a way as to permit a plurality of the drones 200 to fly in a single exclusive controlled airspace in the flight vehicle system 10 in the second embodiment.

Furthermore, in the process according to the flowchart of FIG. 24, even if the drone 200 that does not have the ability to avoid other flight vehicles exists in the front of the queue of the entry application pending drone information, the drone 200 in the back of the queue is preferentially allowed to enter if the drone 200 has the ability to avoid other flight vehicles.

Note that in order to avoid a situation in which the drone 200 that has the function of avoiding other flight vehicles prevents the preceding drone 200 that does not have the ability to avoid other flight vehicles from entering for a long time, the process may exit the entry permission/rejection determination loop when a determination is made for the drone 200 that does not have the ability to avoid other flight vehicles in the process of the flowchart of FIG. 24.

In addition, the control system 100 may be configured such that the number of times the drone 200 that does not have the ability to avoid other flight vehicles has not permitted entry in the entry permission/rejection determination loop is counted, and when the number of times has reached a predetermined number, the process exits the entry permission/rejection determination loop, so that entry determination is not made (entry permission is not granted) for the drone 200 in the back of the queue of the entry application pending drone information until the drone 200 that does not have the ability to avoid other flight vehicles is allowed to enter. Addition of these processes make it possible to prevent the drone 200 that does not have the ability to avoid other flight vehicles from waiting for entry for more than a certain length of time.

The control system 100 performs the processes shown in the flowcharts of FIGS. 23 and 24 above. As a result, a plurality of the drones 200 can simultaneously exist and fly in the exclusive controlled airspace if the drones 200 have the ability to avoid other flight vehicles, so that it is possible to improve the efficiency of using the exclusive controlled airspace. Furthermore, at the same time, it is also possible to allow the drone 200 to safely fly even if the drone 200 has no ability to avoid other flight vehicles and requires exclusive use of the exclusive controlled airspace.

3. Variations

Note that examples in which flight vehicles are drones have been shown in the above-described embodiments. Although detailed description is omitted, the present technology can also be applied to other flight vehicles in a similar manner.

Furthermore, while preferred embodiments of the present disclosure have been described above in detail with reference to the accompanying drawings, the technical scope of the present disclosure is not limited to such examples. It will be apparent to a person having ordinary skill in the art of the present disclosure that various modifications or alterations can be conceived within the scope of the technical idea described in the claims. It is understood that, of course, such modifications or alterations are also within the technical scope of the present disclosure.

Furthermore, the effects described in the present specification are merely explanatory or illustrative, and not restrictive. That is, the technology according to the present disclosure can achieve other effects obvious to those skilled in the art from descriptions in the present specification, together with or instead of the above-described effects.

Furthermore, the present technology can also adopt the following configurations.

(1) An information processing apparatus including:
  a controlling control unit that performs control in such a way as to limit the number of flight vehicles that enter exclusive controlled airspace, the exclusive controlled airspace including an area where the flight vehicles cannot report their own locations.

(2) The information processing apparatus according to (1) above, in which
  the controlling control unit limits the number of the flight vehicles that enter the exclusive controlled airspace to one.

(3) The information processing apparatus according to (2) above, in which
  in a case where the controlling control unit receives an entry application from one of the flight vehicles that seeks to enter the exclusive controlled airspace, the controlling control unit transmits entry permission to the one of the flight vehicles when none of the flight vehicles other than the one of the flight vehicles has entered the exclusive controlled airspace.

(4) The information processing apparatus according to (3) above, in which
  when any of the flight vehicles other than the one of the flight vehicles has entered the exclusive controlled airspace, a standby instruction is transmitted to the one of the flight vehicles.

(5) The information processing apparatus according to (3) above, in which
  in a case where the controlling control unit receives the entry application from the one of the flight vehicles that seeks to enter the exclusive controlled airspace, the controlling control unit updates entering flight vehicle information for the exclusive controlled airspace when none of the flight vehicles other than the one of the flight vehicles has entered the exclusive controlled airspace, when the entry permission is transmitted to the flight vehicle, or when entry notification is received from the flight vehicle.

(6) The information processing apparatus according to (5) above, in which
the exclusive controlled airspace includes a special control area and an entry/exit control area, the special control area being an area where a self-location report cannot be made, the entry/exit control area being set around the special control area,
the entry application is received before the one of the flight vehicles enters the entry/exit control area, and
the entry notification is received after the one of the flight vehicles enters the entry/exit control area.

(7) The information processing apparatus according to any one of (2) to (6) above, in which
in a case where the controlling control unit receives an exit application from one of the flight vehicles that seeks to leave the exclusive controlled airspace, the controlling control unit transmits exit permission to the one of the flight vehicles when there is no other flight vehicle around the one of the flight vehicles.

(8) The information processing apparatus according to (7) above, in which
the controlling control unit transmits a standby instruction to the one of the flight vehicles when there is any other flight vehicle around the one of the flight vehicles.

(9) The information processing apparatus according to (7) above, in which
the controlling control unit updates entering flight vehicle information for the exclusive controlled airspace when the exit application is received from the one of the flight vehicles that seeks to leave the exclusive controlled airspace, when the exit permission is transmitted to the flight vehicle, or when exit notification is received from the one of the flight vehicles to which the exit permission has been transmitted.

(10) The information processing apparatus according to (9) above, in which
when there are a predetermined number of flight vehicles in an entry waiting state, the controlling control unit transmits entry permission to a flight vehicle having been put in the waiting state earliest.

(11) The information processing apparatus according to (9) above, in which
the exclusive controlled airspace includes a special control area and an entry/exit control area, the special control area being an area where a self-location report cannot be made, the entry/exit control area being set around the special control area,
the exit application is received after the one of the flight vehicles enters the entry/exit control area, and
the exit notification is received after the one of the flight vehicles leaves the entry/exit control area.

(12) The information processing apparatus according to (1) above, in which
in a case where the flight vehicle that does not have an ability to avoid other flight vehicles has entered the exclusive controlled airspace, the controlling control unit limits the number of the flight vehicles that enter the exclusive controlled airspace to one while the flight vehicle that does not have the ability to avoid other flight vehicles exists in the exclusive controlled airspace.

(13) The information processing apparatus according to (1) above, in which
in a case where the flight vehicle having an ability to avoid other flight vehicles has entered the exclusive controlled airspace, the controlling control unit permits the flight vehicle having the ability to avoid other flight vehicles to enter the exclusive controlled airspace.

(14) The information processing apparatus according to (13) above, in which
in a case where the number of the flight vehicles having entered the exclusive controlled airspace and having the ability to avoid other flight vehicles has reached an upper limit, the controlling control unit does not permit the flight vehicle having the ability to avoid other flight vehicles to enter the exclusive controlled airspace.

(15) The information processing apparatus according to (1) above, in which
in a case where the flight vehicle having an ability to avoid other flight vehicles has entered the exclusive controlled airspace, the controlling control unit does not permit the flight vehicle that does not have the ability to avoid other flight vehicles to enter the exclusive controlled airspace.

(16) The information processing apparatus according to (15) above, in which
the controlling control unit does not permit the flight vehicle that does not have the ability to avoid other flight vehicles to enter the exclusive controlled airspace until all the flight vehicles having entered the exclusive controlled airspace leave the exclusive controlled airspace.

(17) The information processing apparatus according to any one of (1) to (16) above, in which
the exclusive controlled airspace is airspace including an area where the flight vehicle cannot perform wireless communication or an area where the flight vehicle cannot obtain its own location.

(18) The information processing apparatus according to any one of (1) to (17) above, in which
the flight vehicle is a drone.

(19) An information processing method including:
a controlling control step of performing control in such a way as to limit the number of flight vehicles that enter exclusive controlled airspace, the exclusive controlled airspace including an area where the flight vehicles cannot report their own locations.

(20) A program for causing a computer to function as:
a controlling control means of performing control in such a way as to limit the number of flight vehicles that enter exclusive controlled airspace, the exclusive controlled airspace including an area where the flight vehicles cannot report their own locations.

(21) A flight vehicle system including:
a control system; and
a predetermined number of flight vehicles existing in controlled airspace of the control system,
in which exclusive controlled airspace is set in the controlled airspace, the exclusive controlled airspace including an area where the flight vehicles cannot report their own locations to the control system,
the flight vehicles transmit entry applications and exit applications to the control system in a case where the flight vehicles pass through the exclusive controlled airspace, and
the control system performs control in such a way as to limit the number of the flight vehicles that enter the exclusive controlled airspace on the basis of the entry applications and the exit applications transmitted from the flight vehicles.

REFERENCE SIGNS LIST

10 Flight vehicle system
100 Control system
101 Communication unit
102 Exclusive controlled airspace management unit
103 Exclusive controlled airspace entry management unit
104 Controlling control unit
200, 200A, 200B Drone
201 Communication unit
202 Self-location estimation unit
203 Controlled airspace storage unit
204 Flight plan storage unit
205 Flight control unit
206 Airframe control unit
207 Obstacle detection unit

The invention claimed is:

1. An information processing apparatus comprising:
a transceiver; and
a control circuit operatively connected to the transceiver and configured to:
determine a number of flight vehicles within a predetermined region adjacent to exclusive controlled airspace, and
transmit one or more control signals to limit a number of the flight vehicles within the predetermined region that enter the exclusive controlled airspace, the exclusive controlled airspace including an area where the flight vehicles cannot report their own locations,
wherein the control circuit limits the number of the flight vehicles that enter the exclusive controlled airspace to one of the flight vehicles,
wherein, based on the control circuit receiving an entry application from the one of the flight vehicles indicating that the one of the flight vehicles seeks to enter the exclusive controlled airspace, the control circuit transmits an entry permission to the one of the flight vehicles based on a determination that none of the flight vehicles other than the one of the flight vehicles have entered the exclusive controlled airspace, and
wherein, based on the control circuit receiving an exit application from the one of the flight vehicles indicating that the one of the flight vehicles seeks to leave the exclusive controlled airspace, the control circuit transmits an exit permission to the one of the flight vehicles based on a determination that there is no other flight vehicle of the flight vehicles within a predetermined region around the one of the flight vehicles.

2. The information processing apparatus according to claim 1, wherein
when on a determination that any of the flight vehicles other than the one of the flight vehicles have entered the exclusive controlled airspace, the control circuit transmits a standby instruction to the one of the flight vehicles.

3. The information processing apparatus according to claim 1, wherein
based on the control circuit receiving the entry application from the one of the flight vehicles that seeks to enter the exclusive controlled airspace, the control circuit updates entering flight vehicle information for the exclusive controlled airspace based on a determination that none of the flight vehicles other than the one of the flight vehicles have entered the exclusive controlled airspace, based on the entry permission that has been transmitted to the one of the flight vehicles flight-vehicle, or based on an entry notification is that has been received from the one of the flight vehicles.

4. The information processing apparatus according to claim 3, wherein
the exclusive controlled airspace includes a special control area and an entry/exit control area, the special control area being an area where a self-location report cannot be made by any of the flight vehicles, the entry/exit control area being set around the special control area,
the entry application is received before the one of the flight vehicles enters the entry/exit control area, and
the entry notification is received after the one of the flight vehicles enters the entry/exit control area.

5. The information processing apparatus according to claim 1, wherein
the control circuit transmits a standby instruction to the one of the flight vehicles based on a determination that there is at least one other flight vehicle of the flight vehicles around the one of the flight vehicles.

6. The information processing apparatus according to claim 1, wherein
the control circuit updates entering flight vehicle information for the exclusive controlled airspace based on the exit application having been received from the one of the flight vehicles that seeks to leave the exclusive controlled airspace, based on the exit permission having been transmitted to the flight vehicle, or based on an exit notification having been received from the one of the flight vehicles to which the exit permission has been transmitted.

7. The information processing apparatus according to claim 6, wherein
based on a determination that there are a predetermined number of the flight vehicles in an entry waiting state, the control circuit transmits entry permission to a flight vehicle of the predetermined number of the flight vehicles in the entry waiting state that has been put in the waiting state the earliest.

8. The information processing apparatus according to claim 6, wherein
the exclusive controlled airspace includes a special control area and an entry/exit control area, the special control area being an area where a self-location report cannot be made by any of the flight vehicles, the entry/exit control area being set around the special control area,
the exit application is received after the one of the flight vehicles enters the entry/exit control area, and
the exit notification is received after the one of the flight vehicles leaves the entry/exit control area.

9. The information processing apparatus according to claim 1, wherein the control circuit limits the number of the flight vehicles that enter the exclusive controlled airspace to the one of the flight vehicles based on the one of the flight vehicles not having an ability to avoid at least one other of the flight vehicles.

10. The information processing apparatus according to claim 1 wherein the control circuit transmits the entry permission to the one of the flight vehicles after all of the flight vehicles that previously entered the exclusive controlled airspace leave the exclusive controlled airspace.

11. The information processing apparatus according to claim 1, wherein
the exclusive controlled airspace is an airspace including an area where the flight vehicles cannot perform wireless communication or an area where the flight vehicles cannot obtain their own location.

12. The information processing apparatus according to claim 1, wherein
the flight vehicles are drone aircraft.

13. An information processing method performed by an information processing apparatus that includes a transceiver and a control circuit, the method comprising:
   determining a number of flight vehicles within a predetermined region adjacent to exclusive controlled airspace; and
   transmitting one or more control signals to limit a number of the flight vehicles within the predetermined region that enter the exclusive controlled airspace, the exclusive controlled airspace including an area where the flight vehicles cannot report their own locations,
   wherein the method further comprises:
   limiting the number of the flight vehicles that enter the exclusive controlled airspace to one of the flight vehicles;
   based on receiving an entry application from the one of the flight vehicles indicating that the one of the flight vehicles seeks to enter the exclusive controlled airspace, transmitting an entry permission to the one of the flight vehicles based on a determination that none of the flight vehicles other than the one of the flight vehicles have entered the exclusive controlled airspace; and
   based on receiving an exit application from the one of the flight vehicles indicating that the one of the flight vehicles seeks to leave the exclusive controlled airspace, transmitting an exit permission to the one of the flight vehicles based on a determination that there is no other flight vehicle of the flight vehicles within a predetermined region around the one of the flight vehicles.

14. A non-transitory computer program containing instructions for causing a computer to perform a method, the method comprising:
   determining a number of flight vehicles within a predetermined region adjacent to exclusive controlled airspace; and
   transmitting one or more control signals to limit a number of the flight vehicles within the predetermined region that enter the exclusive controlled airspace, the exclusive controlled airspace including an area where the flight vehicles cannot report their own locations,
   wherein the method further comprises:
   limiting the number of the flight vehicles that enter the exclusive controlled airspace to one of the flight vehicles:
   based on receiving an entry application from the one of the flight vehicles indicating that the one of the flight vehicles seeks to enter the exclusive controlled airspace, transmitting an entry permission to the one of the flight vehicles based on a determination that none of the flight vehicles other than the one of the flight vehicles have entered the exclusive controlled airspace; and
   based on receiving an exit application from the one of the flight vehicles indicating that the one of the flight vehicles seeks to leave the exclusive controlled airspace, transmitting an exit permission to the one of the flight vehicles based on a determination that there is no other flight vehicle of the flight vehicles within a predetermined region around the one of the flight vehicles.

15. A flight vehicle system comprising:
   a control system including an information processing apparatus that comprises a transceiver and a control circuit; and
   a predetermined number of flight vehicles existing in an airspace controlled by the control system,
   wherein an exclusive controlled airspace is set in the controlled airspace, the exclusive controlled airspace including an area where the flight vehicles cannot report their own locations to the control system,
   the flight vehicles transmit entry applications and exit applications to the control system based on the flight vehicles having flight paths that pass through the exclusive controlled airspace, and
   the control system configured to:
   determine a number of the flight vehicles within a predetermined region adjacent to exclusive controlled airspace, and
   transmit one or more control signals to limit a number of the flight vehicles within the predetermined region that enter the exclusive controlled airspace based on the entry applications and the exit applications transmitted from the flight vehicles
   wherein the control circuit limits the number of the flight vehicles that enter the exclusive controlled airspace to one of the flight vehicles,
   wherein, based on the control circuit receiving an entry application from the one of the flight vehicles indicating that the one of the flight vehicles seeks to enter the exclusive controlled airspace, the control circuit transmits an entry permission to the one of the flight vehicles based on a determination that none of the flight vehicles other than the one of the flight vehicles have entered the exclusive controlled airspace, and
   wherein, based on the control circuit receiving an exit application from the one of the flight vehicles indicating that the one of the flight vehicles seeks to leave the exclusive controlled airspace, the control circuit transmits an exit permission to the one of the flight vehicles based on a determination that there is no other flight vehicle of the flight vehicles within a predetermined region around the one of the flight vehicles.

\* \* \* \* \*